March 6, 1962 J. B. WIENER 3,023,894
CARD PROCESSING SYSTEM
Filed Feb. 20, 1956 6 Sheets-Sheet 1

JEROME B. WIENER
INVENTOR.

BY Smyth & Roston

ATTORNEY

JEROME B. WIENER
INVENTOR.

BY Smyth & Roston

ATTORNEY

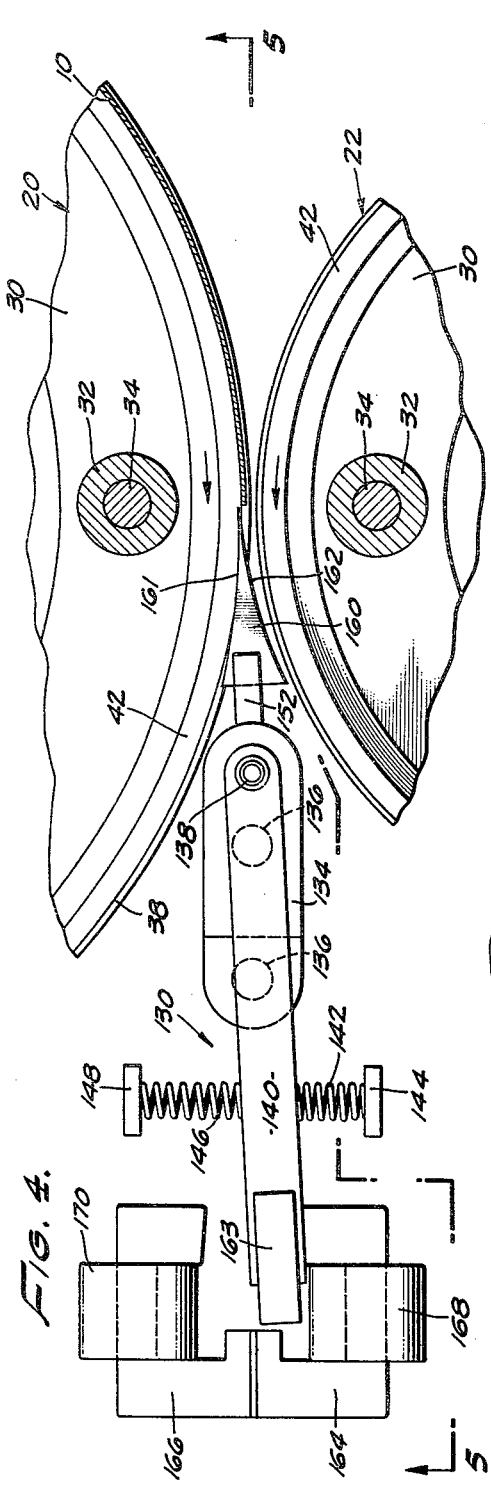
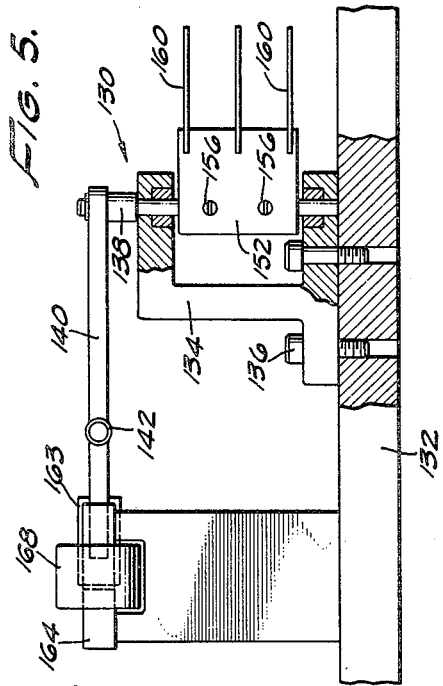
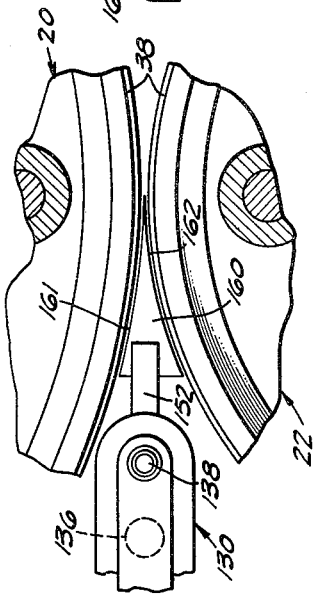

JEROME B. WIENER
INVENTOR.

BY Smyth + Roston
ATTORNEY

March 6, 1962 J. B. WIENER 3,023,894
CARD PROCESSING SYSTEM
Filed Feb. 20, 1956 6 Sheets-Sheet 6
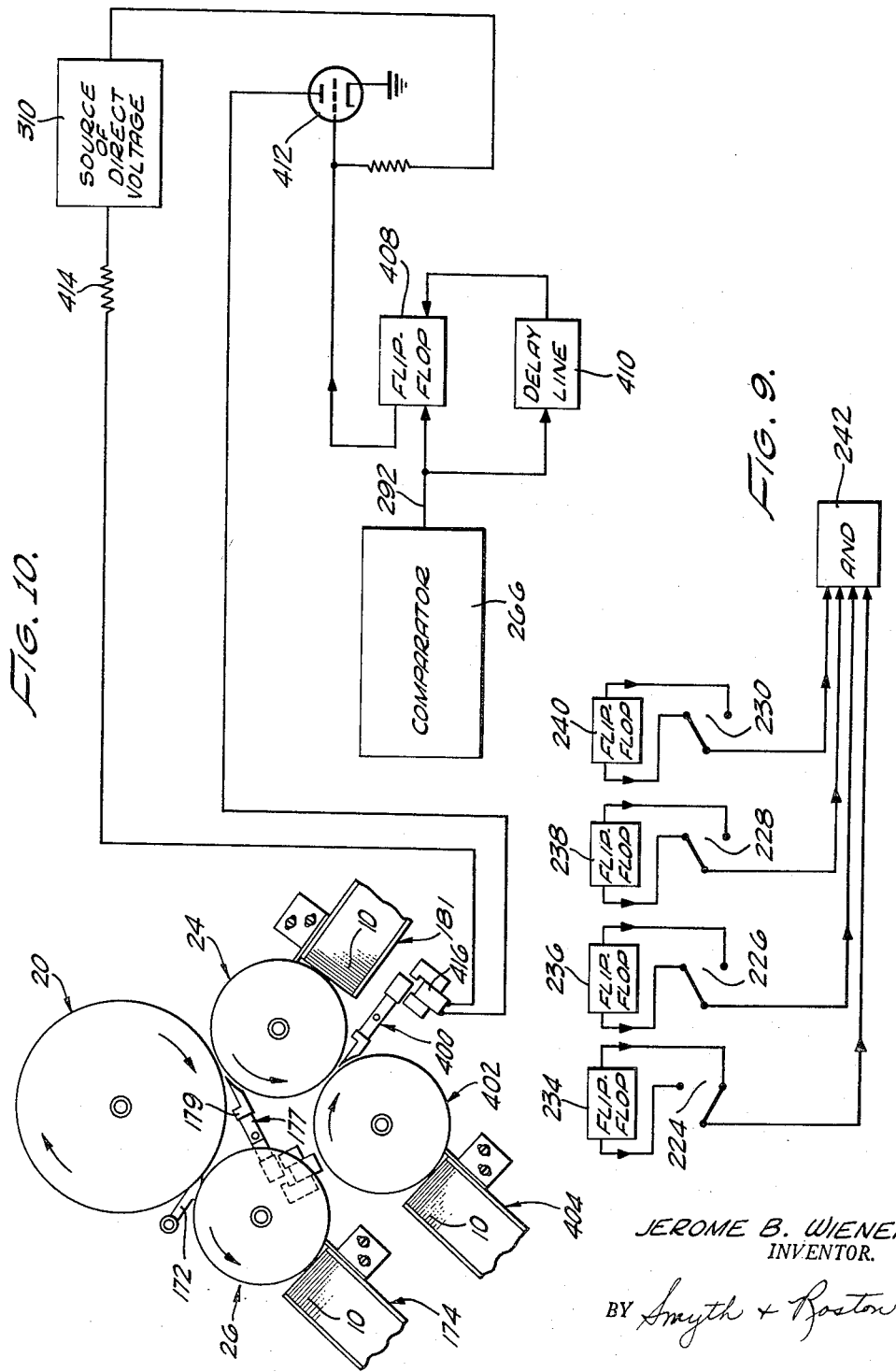
JEROME B. WIENER
INVENTOR.
BY Smyth + Roston
ATTORNEY

United States Patent Office 3,023,894
Patented Mar. 6, 1962

3,023,894
CARD PROCESSING SYSTEM
Jerome B. Wiener, Granada Hills, Calif., assignor to The Magnavox Company, Los Angeles, Calif., a corporation of Delaware
Filed Feb. 20, 1956, Ser. No. 566,404
24 Claims. (Cl. 209—72)

This invention relates to apparatus for processing stored information and more particularly to apparatus for processing a plurality of cards in accordance with the information stored on the cards. The invention is especially concerned with apparatus for receiving information cards from two or more input stacks and for directing the cards into two or more output stacks in accordance with the information at particular positions on the cards.

In recent years, digital computers and data processing systems have been built for a wide variety of uses. For example, digital computers have been built to solve complex mathematical problems previously incapable of being solved or capable of being solved only after much mental effort. Data processing systems have been built to perform complex business operations on a considerably simplified basis. For example, data processing systems have been built to maintain complete and current records as to the operations of large banks so that reliable decisions can be made as to the cashing of checks and the granting of loans. In large department stores, data processing systems have been used to maintain on a current basis records of inventories and sales as to the multitude of different items available. By maintaining such records of inventories and sales on a current basis, decisions can be made quickly and reliably as to prices and types and quantities of goods to be re-ordered.

In one type of data processing system, information has been stored on a plurality of cards. The information is stored in compact form on the cards as by small holes or minute areas of magnetic polarization such that a considerable number of digital bits of information can be recorded on a single card. Although a considerable number of information bits can be stored on one card, often as many as hundreds of thousands of cards have had to be used when the data processing systems have been used in complex operations.

One type of operation commonly required in data processing systems has been that of collating the information in different cards. For example, it may be desired to compare the information at particular positions on the cards of a first input stack with the information at particular positions of the cards in a second input stack. When similar information exists on cards in the first and seconds stacks, the card from the first stack may be transferred to the second stack or to a third stack or it may be disposed of in some other desirable way. Because of the large number of cards required, it has been difficult to perform collating operations satisfactorily on the cards. If the collating operation is not performed properly, the information in the various cards cannot become presented in a logical pattern. This causes the efficiency in the operation of the card processing system to become impaired.

This invention provides apparatus which overcomes the above difficulties by performing a collating operation on the cards in two or more input stacks so as to direct the cards properly into two or more output stacks. The invention includes a first drum for receiving the cards from the input stacks. As the cards travel along the first drum, the signal information at particular positions on the cards is decoded and compared with the information at corresponding positions on previous cards. One of the two cards being compared is then passed toward the output stacks in accordance with the relative decoded information on the cards. The card passes to a particular one of two or more output stacks in accordance with the relative decoded information on the cards.

The transfer of cards to the various output stacks in accordance with the information on the cards is obtained by using a plurality of drums and by providing variable couplings between different pairs of drums. This variable coupling is instrumental in producing a movement of the successive cards to the proper output stacks. Every time that a card passes to one of the output stacks, it becomes replaced by the next card from one of the input stacks. The particular input stack providing the replaced card in each instant is dependent upon the input stack from which the card passing to the output stack was originally obtained. In this way, a collating system is obtained which operates on an automatic basis.

In the drawings:

FIGURE 4 is an enlarged fragmentary sectional view substantially on the line 4—4 of FIGURE 3 and shows in further detail the construction and relative disposition of the pivotable gate and a pair of drums associated with the gate when the gate has been pivoted into one of its operative positions;

FIGURE 5 is a fragmentary sectional view substantially on the line 5—5 of FIGURE 4 and illustrates in further detail the construction of the pivotable gate shown in FIGURE 4;

FIGURE 6 is an enlarged fragmentary view similar to that shown in FIGURE 4 and illustrates the dispostion of the gate relative to the associated drums in the neutral position of the gate;

FIGURE 9 is a diagram, partly in block form, somewhat schematically illustrating in further detail certain of the stages shown fully in block form in FIGURE 7; and FIGURE 10 is a view, partly in plan from a mechanical standpoint and partly in block form from an electrical standpoint, somewhat schematically illustrating a modification of the invention shown in the previous figures.

Figure 1:
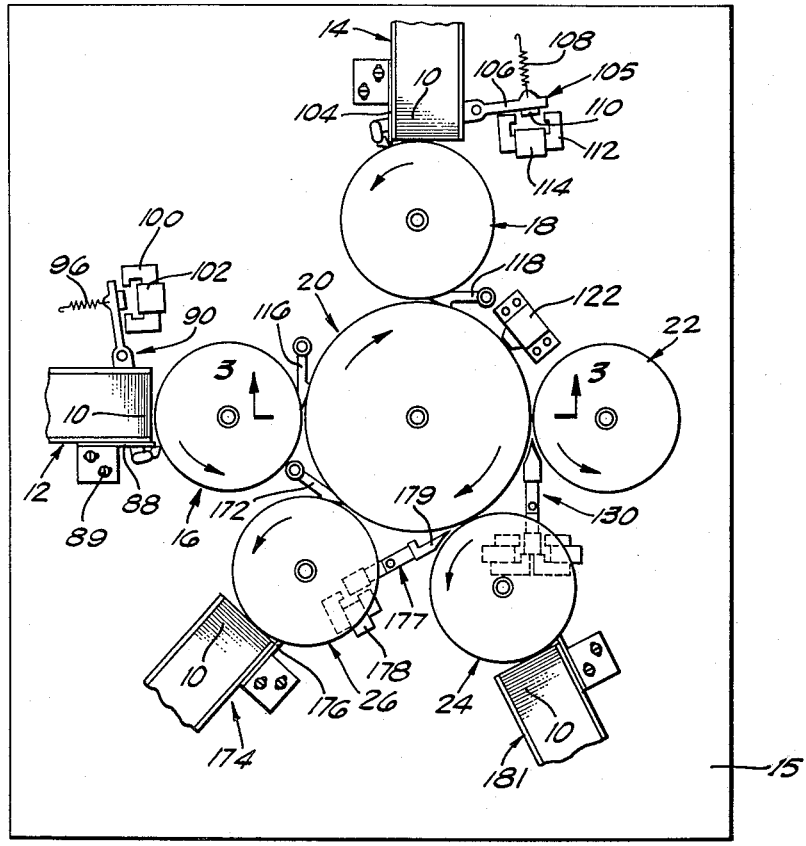
FIGURE 1 is a top plan view of collating apparatus constituting one embodiment of this invention and includes a plurality of drums and at least one pivotable gate associated with the drums for controlling the transfer of information cards from at least a pair of information stacks to a single output stack.

In the embodiment of the invention shown in the drawings, a plurality of cards 10 (FIGURE 1) are disposed in a plurality of stacks such as stacks 12 and 14. The bottom edge of each card is adapted to rest on a flat surface such as the top of a table 15. The faces of each card are disposed in a substantially vertical plane extending in either a lateral or longitudinal direction along the top of the table 15. The faces of the cards in the stack 12 are shown as extending laterally in FIGURE 1, and the faces of the cards in the stack 14 are shown as extending in a longitudinal direction in FIGURE 1.

Figure 7:
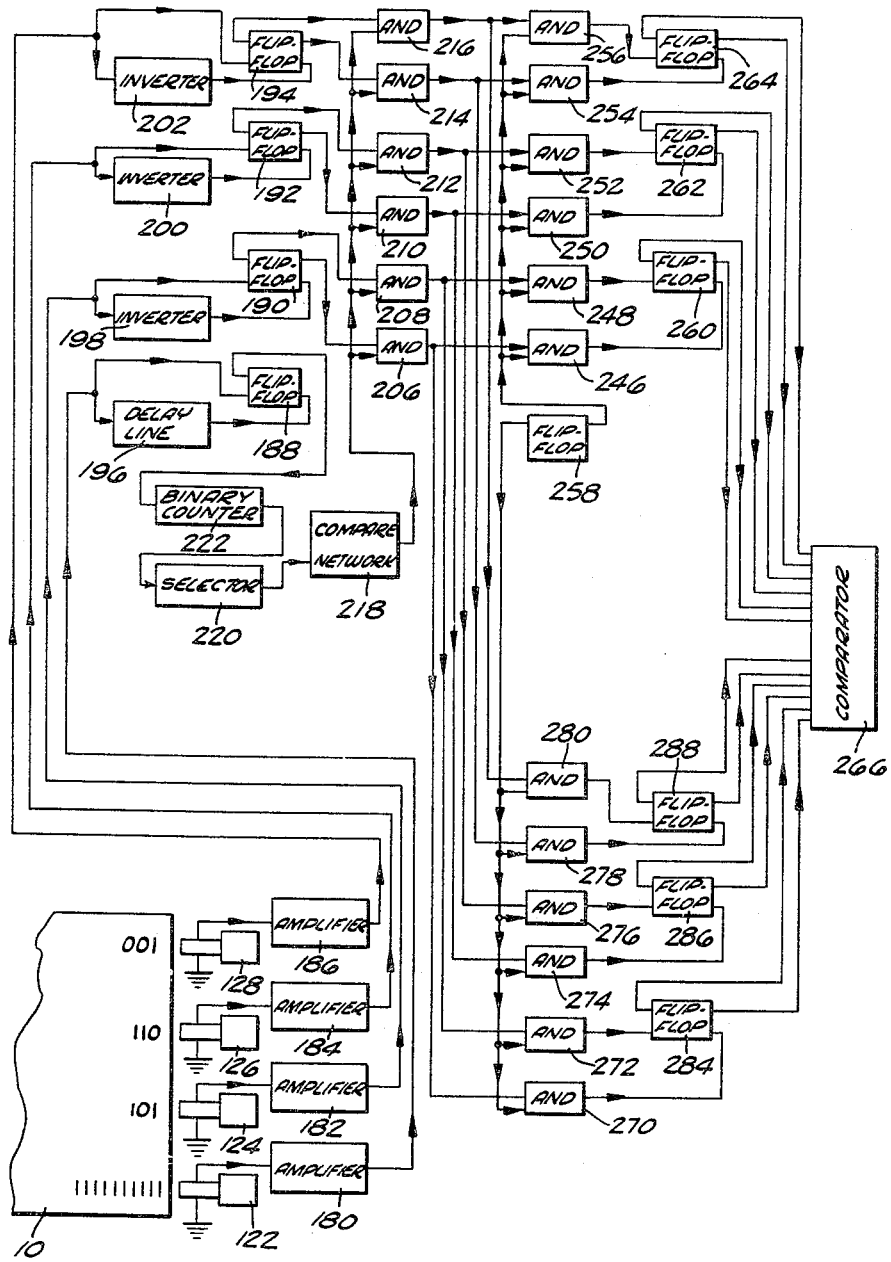
FIGURE 7 is a diagram, partly in block form, somewhat schematically illustrating certain electrical circuitry for controlling the operation of the apparatus shown in the previous figures.

As shown in FIGURE 7, each card 10 is provided with a plurality of bits of information. Each bit of information by itself or in combination with other bits represents information in digital form. This information may relate to numbers, alphabetical letters, combinations of numbers and letters (alphanumeric coding) or any other pertinent matter. The bits of information may be disposed in rows each of which extends in a direction substantially parallel to the top of the table 15. Because of the different angle at which one of the cards 10 is shown in FIGURE 7, the rows are shown as extending horizontally in that figure.

The bits of information may be provided in any suitable form on the card 10. For example, the information may be represented by holes or the absence of holes at the different positions. Preferably, the information is represented in magnetic form. In this form, magnetic fluxes of one polarity at a position may represent an indication of "0" or a "false" state and magnetic fluxes of an opposite polarity at a position may represent an indication of "1" or a "true" state.

Either one face of each card 10 may be magnetically polarized in the different information positions to represent various bits of binary information or both faces may be magnetically polarized in this manner. By polarizing both faces of each card, the number of cards required to store a particular amount of information can be substantially halved. The information on one side of the card will not interfere with the information on the other side of the card if the card is sufficiently thick.

Figure 3:
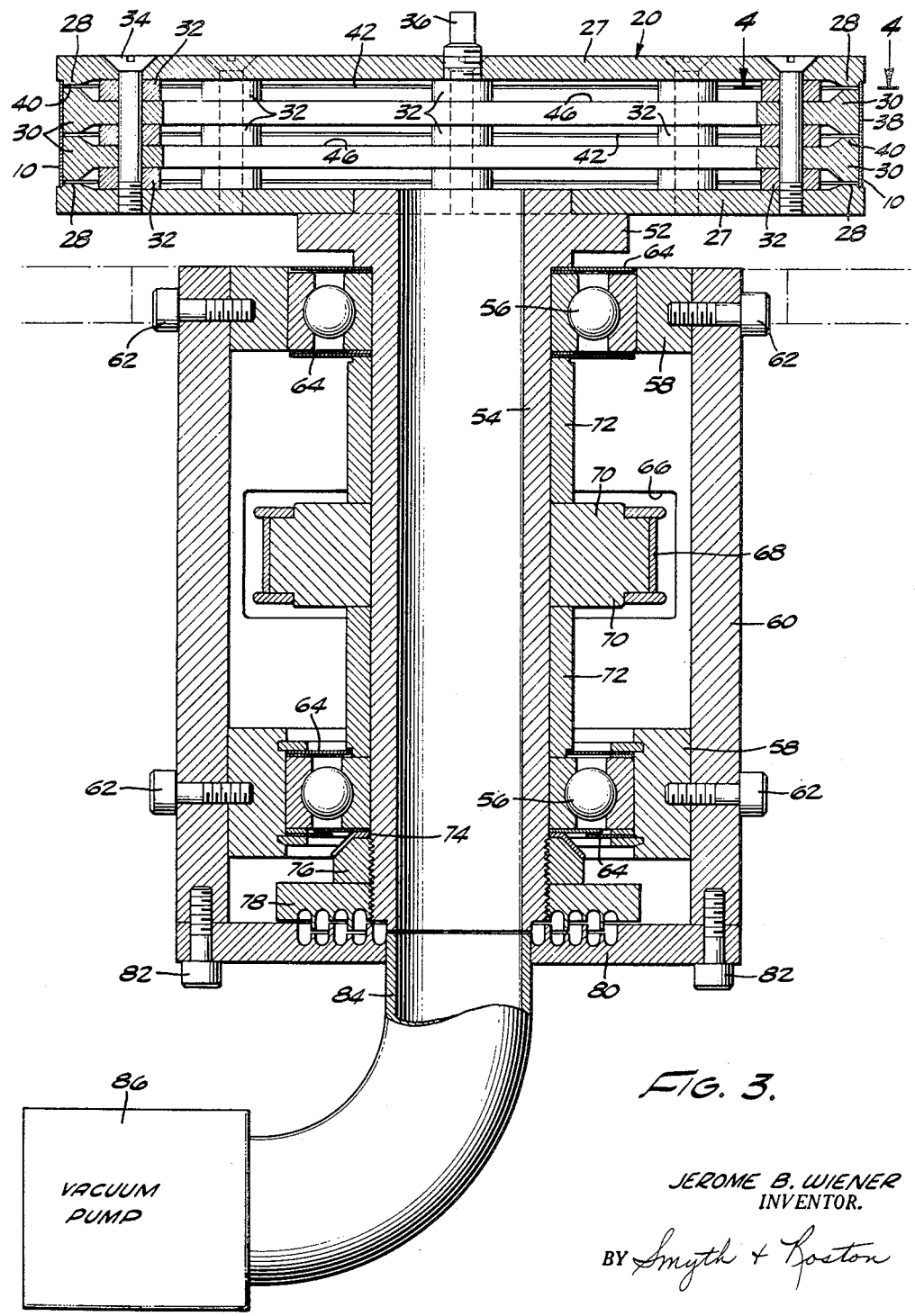
FIGURE 3 is an enlarged sectional view substantially on the line 3—3 of FIGURE 1 and illustrates in further detail the construction of one of the drums forming a part of the embodiment shown in FIGURE 1.

A plurality of drums are disposed relative to one another and to the cards in the input stacks 12 and 14 such that the cards can be withdrawn from each input stack for movement on particular ones of the drums. The drums in the plurality are indicated at 16, 18, 20, 22, 24 and 26 and are provided with similar constructions. For this reason, the construction of the drum 20 is shown in detail in FIGURE 3 and will be described fully subsequently. It is believed that the description relating to the construction of the drum 20 should indicate the construction of the other drums shown in FIGURE 1 because of the similarity of all of the drums.

The drum 20 includes a pair of exterior plates 27 (FIGURE 3) defining a housing and having inwardly disposed lip portions 28 at their peripheries. A second pair of plates 30 are disposed within the compartment defined by the plates 27 and are suitably disposed in spaced relationship to the plates 27 as by spacers 32 mounted on studs 34. The studs 34 extend through the plates 27 and 30 at positions near the peripheries of the plates to maintain the plates in fixed position relative to one another. A plug 36 also extends into a threaded socket in the upper plate 27 at the annular center of the plate.

The radius of the plates 30 is slightly less than that of the plates 27 by a distance corresponding substantially to the thickness of the cards 10 so as to form a neck portion 38 relative to the periphery of the plates 27. Each of the plates 30 has annular flange portions 40 extending axially from both faces of the plate 30 at the periphery of the plate. The flange portions 40 are so formed as to produce slots 42 between the plates 30 and between the flanges on the plates 30 and the lip portions 28 on the plates 27. The slots 42 communicate with suction passageways 46 formed between adjacent plates by the inclusion of the spacers 32.

The drum 20 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeve 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed by a push-fit within the plate 80. In this way, air can be exhausted from the hollow interiors of the shaft 54 and the conduit 84 as by a vacuum pump 86. Although the pump 86 is shown in block form in FIGURE 3, it should be appreciated that any suitable type of pump can be used.

The drum 16 is disposed in frictional relationship with the cards 10 at one end of the stack 12 such as the right end in FIGURE 1. This frictional relationship may be obtained at least in part by the vacuum produced on the periphery of the drum 16. A throat member 88 is disposed in contiguous relationship to the periphery of the drum 16. The throat member 88 is disposed at a position near the stack 12 but angularly removed from the stack in the direction of rotation of the drum. When the drum 16 rotates in a counterclockwise direction as shown in FIGURE 1, the throat member 88 is disposed in a counterclockwise direction relative to the stack 12. The throat member 88 is adjustably positioned relative to the periphery of the drum as by elongated slots and screws 89 extending through the slots into the table 15.

A gate generally indicated at 90 is associated with the drum 16 to control the removal of cards by the drum from the input stack 12. The gate 90 includes a bar 92 pivotable on a pin 93 to a position overhanging the throat member 88. The bar 92 carries at one end a support member 94 which in turn carries fingers 95 adapted to fit within the slots 42 in the associated drum 16. The fingers 95 may be similar to those shown in FIGURES 4, 5 and 6 and hereinafter to be described in detail. The bar 92 is normally disposed in a position providing a coupled relationship between the fingers 95 and the slots 42 in the drum 16. This disposition of the fingers 95 in the slots 42 is obtained by the operation of a spring 96 disposed at the end of the bar removed from the throat member. As will be described in detail subsequently, the bar 92 carries an armature 98 disposed in magnetic proximity to a magnet 100. The magnet 100 is adapted to be energized by a coil 102 suitably wound on the magnet so as to pivot the bar 92 in a direction opposite to the action of the spring 96 on the bar.

In like manner, a throat member 104 is disposed in contiguous relationship to the drum 18 at a position removed from the stack 14 in the direction of rotation of the drum. This would cause the throat member 104 to be angularly displaced from the stack 14 in a counterclockwise direction since the drum 18 rotates in this direction. The throat member 104 is adjustably positioned relative to the drum 18 in a manner similar to that described above for the throat member 88.

Just as the gate 90 is associated with the drum 16, a gate generally indicated at 105 is associated with the drum 18 to control the removal of cards by the drum from the input stack 14. The gate member 105 includes a bar 106 pivotably disposed relative to the throat member 104. A spring 108 is adapted to act on the bar 106 to pivot the bar in a direction for preventing the passage of cards on the drum 18 past the throat member 104, as by the disposition of fingers in the slots of the drum in a manner similar to that shown in FIGURE 2. An armature 110 is carried by the bar 106 and is associated with a magnet 112 and a coil 114 wound on the magnet to produce a pivotal movement of the bar away from the throat member 104 when the coil 114 is energized.

The drum 20 is disposed in contiguous relationship to the drums 16 and 18. A gate 116 is fixedly disposed between the drums 16 and 20 at the position of the drum contiguity. Although a fixed gate similar to the gate 116 is not shown in detail in the drawings, it may be deduced by a person skilled in the art from the construction of one of the pivotable gates shown in FIGURES 4, 5 and 6. The construction and operation of a gate similar to the gate 116 is also shown in detail in co-pending application Serial No. 505,248, filed May 2, 1955, by Alfred M. Nelson and Hans M. Stern.

In like manner, the drum 20 is disposed in contiguous relationship to the drum 18. The drum 20 is contiguous to the drum 18 at a position removed from the drum 16 in the direction of movement of the drum 20. Since the drum 20 is rotating in a clockwise direction, the drum 18 is displaced along the drum 20 in a clockwise direction relative to the disposition of the drum 16. A gate 118 corresponding in construction to the gate 116 extends to a position between the drums 18 and 20 at the position of the drum contiguity.

As shown in FIGURES 1 and 7, a plurality of transducing members are disposed in contiguous relationship to the drum 20. Four transducing members are indicated at 122, 124, 126 and 128 in FIGURES 1 and 7 but it should be appreciated that any other number of transducing members can be used in accordance with the number of different horizontal rows of information on the cards 10. The transducing members such as the members 122, 124 and 126 and 128 are disposed in contiguous relationship to the periphery of the drum 20 at an angular position removed from the drums 16 and 18 in the direction of rotation of the drum 20. In FIGURE 1, the transducing member 122 is shown as being displaced in a clockwise direction from the drums 16 and 18. The distance between the transducing members such as the members 122, 124, 126 and 128 to the position of contiguity between the drums 20 and 22 should be greater than the circumference of the drum 22.

Each of the transducing members such as the members 122, 124, 126 and 128 is provided with magnetic means such as a coil. The coil in each transducing member is so disposed as to be coupled magnetically to the cards 10 during the movement of the cards past the transducing member on the periphery of the drum 20. As will be described in detail subsequently, the transducing members 122, 124, 126 and 128 are connected to "read" the magnetic indications on the different cards and to convert these magnetic indications into a corresponding pattern of electrical signals.

The transducing members 122, 124, 126 and 128 or other similar members may also be connected to record magnetic information on the cards 10 by converting electrical signals into a corresponding pattern of magnetic signals on the cards. Transducing members are shown in the drawings as being associated only with the drum 20. However, other transducing members may be associated with any or all of the other drums as described in co-pending application Serial No. 505,248, filed May 2, 1955, by Alfred M. Nelson and Hans M. Stern.

A gate generally indicated at 130 in FIGURES 4, 5 and 6 is disposed in contiguous relationship to the drums 20 and 22. The gate 130 is disposed relative to the drum 20 at a position removed from the transducing members 122, 124, 126 and 128 in the direction of rotation of the drum. Since the drum 20 is shown in FIGURE 1 as rotating in a clockwise direction, the gate 130 is displaced in this direction from the transducing members 122, 124, 126 and 128. The gate 130 is pivotable into three different positions in a manner which will be described in detail subsequently.

As shown in FIGURES 4, 5 and 6, the gate 130 includes a base 132 (FIGURE 5) which supports a C-shaped brace 134 as by threaded studs 136. A pivot pin 138 extends through a rod 140 and through the horizontal legs of the brace 134. A first spring 142 is supported between the rod 140 and a fixed wall such as that indicated at 144 in FIGURE 4. Similarly, a second spring 146 is supported between the rod 140 and a fixed wall 148. The springs 142 and 146 are disposed on opposite sides of the rod 140 so that one of the springs will be subjected to tension by a lateral movement of the rod 140 at the same time that the other spring is subjected to a compressional force.

A post 152 is fixedly positioned on the pivot pin 138 as by studs 156 which screw into the post to press against the pin. At its outer end, the post 152 supports fingers 160 which taper inwardly as they extend from the post. The fingers 160 taper as at 161 on one side and as at 162 on the opposite side, preferably on a symmetrical basis. In this way, the fingers 160 may be disposed to provide in one pivotable position a coupling from the drum 20 to the drum 22 in a manner similar to that shown in FIGURE 4. In a second pivotable position, the fingers 160 may be disposed to provide a coupling from the drum 22 to the drum 20. This will be described in detail subsequently.

The rod 140 carries at its left end an armature 163. The armature 163 is positioned in magnetic proximity to a magnet 164 to obtain a pivotal movement of the rod 140 in a counterclockwise direction when the magnet is energized. In like manner, the armature 163 is positioned in magnetic proximity to a magnet 166 to produce a pivotal movement of the rod 140 in a clockwise direction when the magnet is energized. The magnets 164 and 166 are respectively adapted to be energized by coils 168 and 170 suitably wound on the magnets.

A fixed gate 172 (FIGURE 1) is disposed between the drums 20 and 26 at the position of drum contiguity. The fixed gate 172 is disposed at a position removed from the gate 130 in the direction of rotation of the drum 20. This corresponds to a clockwise direction in FIGURE 1. An output stack 174 is positioned in contiguous relationship to the periphery of the drum 26 in a counterclockwise direction along the drum with respect to the disposition of the gate 172. A stop 176 is also associated with the drum 26 and the output stack 174 in abutting relationship to the drum 26 to prevent the movement of cards on the drum past the stop. The stop 176 is slightly removed from the stack 174 in a counterclockwise direction. This corresponds to the direction of movement of the drum 26.

A gate generally indicated at 177 is also disposed between the drums 20 and 24 to control the transfer of cards from the drum 20 to the drum 24. The gate 177 may be constructed in a manner similar to the gate 130 except that it is pivotable in only one direction from a neutral position. For this reason, the gate includes only a single coil 178 which acts on a finger 179 to pivot the finger into a relationship coupling the drums 20 and 24. An output stack 181 is disposed in contiguous relationship to the drum 24 to receive the cards moving with the drum.

Figure 8:
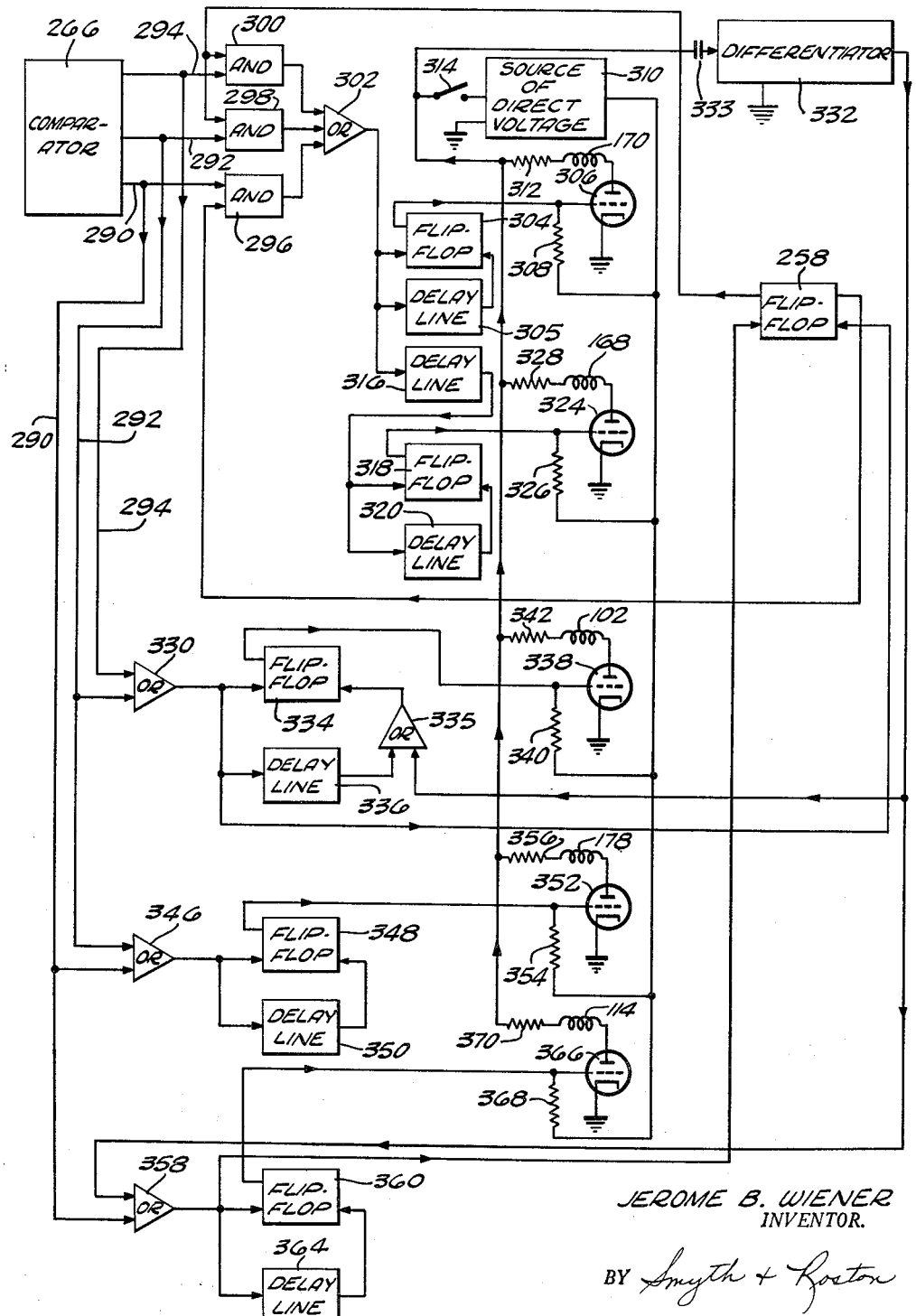
FIGURE 8 is a diagram, partly in block form, somewhat schematically illustrating certain electrical circuitry for operating in conjunction with the circuitry shown in FIGURE 7 to control the operation of the apparatus shown in FIGURES 1 to 6, inclusive.

In FIGURES 7 to 9, inclusive, electrical circuitry is shown for controlling the operation of the magnetic members shown in FIGURES 1 to 6, inclusive, and described above. The electrical circuitry includes the transducing members such as the heads 122, 124, 126 and 128 which are disposed in magnetic proximity to each of the cards 10 as the cards move with the drum 20 during the drum rotation. The output signals from the transducing members such as the members 122, 124, 126 and 128 are introduced to amplifiers such as amplifiers 180, 182, 184 and 186 in FIGURE 7.

The output signals from the amplifiers such as the amplifiers 180, 182, 184 and 186 are introduced to corresponding input terminals of flip-flops such as flip-flops 188, 190, 192 and 194. The flip-flops may be constructed in a manner similar to that described on pages 164 to 166, inclusive of volume 19 entitled "Wave Forms" of the Radiation Laboratory Series published in 1949 by the Massachusetts Institute of Technology. Each of the flip-flops may be provided with two input terminals designated for convenience as the left and right input terminals. The output signals from the amplifiers 180, 182, 184 and 186 are shown as being respectively introduced to the left input terminals of the flip-flops 188, 190, 192 and 194.

The output signals from the amplifier 180 are also introduced through a delay line 196 to the right input terminal of the flip-flop 188. The delay line 196 is adapted to provide a delay equal to substantially one half of the time required for adjacent vertical columns on the cards 10 to move past the heads such as the heads 122, 124, 126 and 128. The purpose of the delay line 196 is to provide clock signals in the flip-flop 188 as will be described in detail subsequently. The output signals from the amplifiers 182, 184 and 186 are also respectively introduced through inverters 198, 200 and 202 to the right input terminals of the flip-flops 190, 192 and 194. The inverters 198, 200 and 202 may be conventional amplifier circuits adapted to invert the polarity of the signals introduced to them.

The flip-flops such as the flip-flops 188, 190, 192 and 194 also have two output terminals designated for convenience as the left and right output terminals. In FIGURE 7, the right and left output terminals of the flip-flops 190, 192 and 194 are respectively shown as being introduced to input terminals of "and" networks 206 and 208, networks 210 and 212 and networks 214 and 216. The "and" networks may be constructed in a manner well known to persons skilled in the art. Each of the "and" networks such as the "and" networks 206, 208, 210, 212, 214 and 216 also has a second input terminal connected to the output terminal of a compare network 218, one form of which will be described in some detail subsequently.

Connections are made to input terminals of the compare network 218 from a selector 220 and a binary counter 222. One embodiment of the compare network 218, the selector 220 and the binary counter 222 are shown in FIGURE 9. The selector 220 may be formed from a plurality of single-pole, double-throw switches such as switches 224, 226, 228 and 230 in FIGURE 9. The switches such as the switches 224, 226, 228 and 230 may be pre-set into a particular pattern of operation by setting the movable contacts of the switches. For example, the movable contact of the switch 224 may be set into engagement with the lower stationary contact of the switch in a manner similar to that shown in FIGURE 9. Similarly, the movable contacts of the switches 226, 228 and 230 may be set into engagement with the upper contacts of the switches shown in FIGURE 9. The movable contacts of the switches 224, 226, 228 and 230 may be set in a particular pattern corresponding to the particular vertical column to be selected on each card 10 for reading.

The counter 222 in FIGURE 7 may be formed from a plurality of flip-flops such as flip-flops 234, 236, 238 and 240 in FIGURE 9. The flip-flops such as flip-flops 234, 236, 238 and 240 may be connected in a conventional manner in a cascade arrangement. In such an arrangement, each flip-flop is adapted to be triggered by a signal from the preceding flip-flop. When the preceding flip-flops are operated in a particular pattern, the first flip-flop 234 in the cascade arrangement is adapted to be triggered by each signal from the flip-flop 188 in FIGURE 7 in accordance with the connection shown in that figure.

The flip-flops 234, 236, 238 and 240 are respectively associated with the switches 224, 226, 228 and 230. For example, the left output terminal of each flip-flop is connected to the upper stationary contact of its associated switch in FIGURE 9. Similarly, a connection is made in FIGURE 9 from the right output terminal of each flip-flop to the lower stationary contact of the associated switch. The voltages on the movable contacts of the switches 224, 226, 228 and 230 are applied to input terminals of an "and" network 242 in FIGURE 9. The "and" network 242 shown in FIGURE 9 may be one form of the compare network 218 shown in FIGURE 7.

The output signals from the "and" networks 206, 208, 210, 212, 214 and 216 in FIGURE 7 are respectively introduced to input terminals of "and" networks 246, 248, 250, 252, 254 and 256. Another input terminal of each of the "and" networks 246, 248, 250, 252, 254 and 256 is connected to the right output terminal of a flip-flop 258 also shown in FIGURE 8. Connections are respectively made from the output terminals of the "and" networks 248 and 246 to the left and right input terminals of a flip-flop 260; from the output terminals of the "and" networks 252 and 250 to the left and right input terminals of a flip-flop 262; and from the output terminals of the "and" networks 256 and 254 to the left and right input terminals of a flip-flop 264.

The voltages on the left and right output terminals of the flip-flops 260, 262 and 264 pass to input terminals of a comparator 266 also shown in FIGURE 8. The comparator 266 is shown in block form for purposes of simplicity. Actually, the comparator 266 is formed from a plurality of "and" and "or" networks interrelated in a logical pattern in accordance with a logical equation which will subsequently be set forth in detail. The comparator 266 may also be constructed in a manner similar to that shown in FIGURES 3d and 3e of Phelps Patent No. 2,602,544 and described in detail in columns 19–27 inclusive of that patent. The comparator 266 may also be constructed in a manner similar to that taught by Knutsen Patent No. 2,712,898 in combination with Phelps Patent No. 2,602,544.

The signals from the "end" networks 206, 208, 210, 212, 214 and 216 not only pass to the "and" networks 246, 248, 250, 252, 254 and 256 but also to "and" networks 270, 272, 274, 276, 278 and 280, respectively. Other input terminals of the "and" networks 270, 272, 274, 276, 278 and 280 are connected to the left output terminal of the flip-flop 258. Connections are respectively made from the "and" networks 270 and 272 to the right and left input terminals of a flip-flop 284; from the "and" networks 274 and 276 to the right and left input terminals of a flip-flop 286; and from the "and" networks 278 and 280 to the right and left input terminals of a flip-flop 288. The voltages on the left and right output terminals of the flip-flops 284, 286 and 288 are introduced to input terminals of the comparator 266.

Output signals from the comparator 266 respectively pass through lines 290, 292 and 294 to input terminals of "and" networks 296, 298 and 300. Other input terminals of the "and" networks 298 and 300 are connected to the left output terminal of the flip-flop 258 (also shown in FIGURE 7). In like manner, a connection is made from the right output terminal of the flip-flop 258 to a second input terminal of the "and" network 296.

An "or" network 302 receives the signals from the "and" networks 296, 298 and 300. The "or" network 302 in turn introduces these signals to the left input terminal of a flip-flop 304 and to the input terminal of a delay line 305 having its output terminal connected to the right input terminal of the flip-flop 304. A connection is made from the left output terminal of the flip-flop 304 to the grid of a tube 306.

The grid of the tube 306 is biased with a negative potential through a resistance 308 from a source 310 of direct voltage so as to inhibit the flow of current through the tube. The cathode of the tube 306 is grounded and a resistance 312 and the coil 170 are in series between the plate of the tube 306 and the movable contact of a manually operated single-pole, single-throw switch 314. The stationary contact of the switch 314 is connected to a terminal of the voltage source 310 to receive a positive potential from the source.

The signals from the "or" network 302 also pass to an input terminal of a delay line 316 having its output terminal connected to the left input terminal of the flip-flop 318 and to an input terminal of a delay line 320. The right input terminal of the flip-flop 318 is connected to the output terminal of the delay line 320 and the left output terminal of the flip-flop is connected to the grid of a tube 324. The grid of the tube 324 may be negatively biased through a resistance 326 from the voltage source 310 to normally cut off the tube. The cathode of the tube 324 is grounded. A resistance 328 and the coil 168 are in series between the plate of the tube 324 and the movable contact of the switch 314.

The signals passing through the lines 292 and 294 are also introduced to input terminals of an "or" network 330. A connection is made from the output terminal of the "or" network 330 to the right input terminal of the flip-flop 258. The signals from the "or" network 330 also pass to the left input terminal of a flip-flop 334 and to an input terminal of a delay line 336. The output terminal of the delay line 336 is connected to an input terminal of an "or" network 335. Another input terminal of the "or" network 335 is connected to the output terminal of a differentiator 332 which may be constructed in a manner similar to that disclosed on pages 2–27 to 2–38, inclusive, of "Principles of Radar," second edition, by the Massachusetts Institute of Technology. As shown on pages 2–31 of this reference, one form of differentiating circuit may comprise a capacitance and resistance in series with the input voltage being applied across the capacitance and the resistance and with the output voltage being taken from the common terminal between the resistance and the capacitance. The differentiator 332 operates on signals passing through a capacitance 333 from the movable contact of the switch 314.

The signals passing through the "or" network 335 are introduced to the right input terminal of the flip-flop 334. The voltage on the left output terminal of the flip-flop 334 is applied to the grid of a tube 338 negatively biased through a resistance 340 from the voltage source 310 to inhibit the flow of current. The cathode of the tube 338 is grounded and the plate of the tube is in series with the coil 102 and a resistance 342 to receive the positive potential from the source 310 when the switch 314 is closed.

An "or" network 346 has input terminals connected through the lines 290 and 292 to the comparator 266. Connections are made from the "or" network 346 to the left input terminal of a flip-flop 348 and to the input terminal of a delay line 350 having its output terminal connected to the right input terminal of the flip-flop. The left output terminal of the flip-flop 348 has its signals applied to the grid of a tube 352. The grid of the tube 352 is negatively biased through a resistance 354 from the voltage source 310. The cathode of the tube 352 is grounded. The coil 173 and a resistance 356 are in series between the plate of tube 352 and the movable contact of the switch 314.

The signals in the line 290 and from the differentiator 332 pass to input terminals of an "or" network 358. The output signals from the "or" network 358 are in turn introduced to the left input terminal of the flip-flop 258. The left input terminal of a flip-flop 360 and the input terminal of a delay line 364 also receive the output signals from the "or" network 358. A connection is made from the left output terminal of the flip-flop 360 to the grid of a tube 366 negatively biased through a resistance 368 from the voltage source 310. The cathode of the tube 366 is grounded and the coil 114 and a resistance 370 are in series with the plate of the tube to receive a positive potential through the switch 314 from the voltage source 310.

Since the drums 16, 18, 20, 22, 24 and 26 are constructed in a similar manner as described above, they also operate in a similar manner. For this reason, the operation of each drum should be understood from a description of the operation of the drum 20. Since the drum 20 is coupled to the shaft 54 (FIGURE 3), it rotates with the shaft when the shaft is driven by the belt 68. The housing 60 remains stationary as the shaft 54 rotates because of the operation of the bearings 56 and the conduit 84 also remains stationary since it is push-fit into the plate 80 defining the bottom of the housing.

Even though the shaft 54 is rotating relative to the conduit 84, the vacuum pump 86 is able to withdraw air through the continuous passage formed by the shaft in the conduit. This results from the operation of the disk 78 and the plate 80 in producing a seal in the junction between the shaft 54 and the conduit 84. The vacuum created by the pump 86 causes air to be withdrawn from the drum 20 through the passageways 46 and the hollow contours of the shaft 54 and the conduit 84. Since the slots 42 communicate with the passageways 46, an inward pressure is created on the periphery of the drum 20 upon the operation of the vacuum pump 86.

As previously described, the drums 16, 18, 22, 24 and 26 are constructed and operate in a manner similar to that described above for the drum 20. In this way, a vacuum force is created on the periphery of each of the drums 16, 18, 20, 22, 24 and 26. This force is instrumental in maintaining the cards 10 in fixed position on the peripheries of the drums as the drums rotate. The cards 10 become positioned on the peripheries of the drums in a manner which will be described in detail subsequently.

Figure 2:
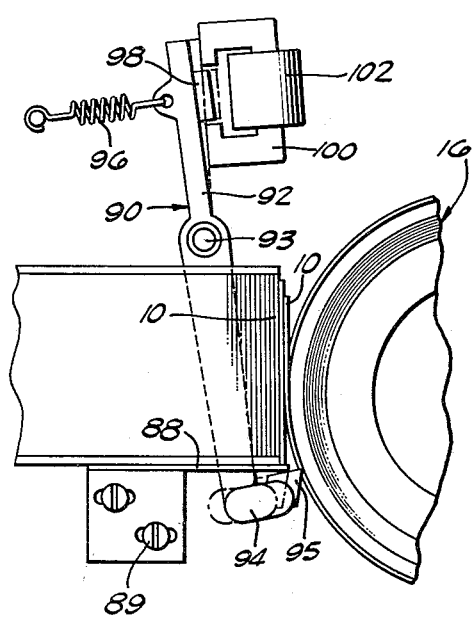
FIGURE 2 is an enlarged fragmentary top plan view somewhat schematically illustrating the construction of a drum forming a part of the embodiment shown in FIGURE 1 and the construction of members associated with the drum for controlling the transfer of cards from one of the input stacks.

In the normal positioning of the bar 92 (FIGURES 1 and 2) forming a part of the gate 90, the fingers 95 fit within the slots 42 of the drum 16 to prevent cards from moving on the drum past the bar. Since the fingers 95 are positioned relatively close to the stack 12, the fingers actually operate in their normal position to prevent any card from leaving the stack 12, as best seen in FIGURE 2. The fingers 95 are moved out of the slots 42 in the drum 16 when the coil 102 is energized by the logical circuitry shown in FIGURES 7 to 9, inclusive. The fingers 95 are moved out of the slots 42 in the drum 16 by the operation of the magnet 100 on the armature 98 when the coil 102 is energized. This causes the armature 98 to be attracted toward the magnet 100 and the bar 92 to be pivoted in a clockwise direction against the action of the spring 96. A pivotal movement of the bar 92 in a clockwise direction causes the bar to move away from the periphery of the drum 16 so that the cards 10 from the stack 12 can move on the drum 16 past the fingers 95.

When the bar 92 is pivoted in a clockwise direction, the drum 16 presses against the card 10 at the right end of the stack 12 and moves the card with it toward the throat member 88. The drum 16 can be made to remove only one of the cards 10 from the stack 12 at any one time by adjusting the spacing between the throat member 88 and the periphery of the drum 16. Upon the removal of each card 10 from the stack 12, the card 10 becomes positioned on the periphery of the drum 16 at the neck portion 38 (FIGURE 3) of the drum. This helps to hold each card 10 in position on the periphery of the drum 16 as the drum rotates.

After each card 10 has been removed by the drum 16 from the stack 12, it rotates through a particular angular distance before reaching the gate 116 in FIGURE 1. Although the gate 116 is fixedly positioned, it has fingers similar to the fingers 160 in FIGURES 4, 5 and 6. These fingers extend between the periphery of the drum 16 at their forward end and the periphery of the drum 20 at their rear end in a manner similar to that shown in FIGURE 4 for the fingers 160. Because of this disposition, the fingers on the gate 116 obtain a transfer of the cards from the periphery of the drum 16 to the periphery of the drum 20. This will be described in detail subsequently in connection with the operation of the gate 130 in FIGURES 4, 5 and 6.

After the cards 10 have been transferred from the drum 16 to the drum 20, they remain fixedly positioned on the periphery of the drum 20 as the drum rotates in a clockwise direction. The cards remain in fixed position on the drum 20 even after they reach the gate 118 (FIGURE 1). This results from the fact that the fingers on the gate 118 are positioned to obtain a transfer of cards only from the drum 18 to the drum 20. Because of the disposition of the fingers on the drum 118, the cards transferred to the drum 20 from the drum 16 pass under the gate 118 and continue their movement on the drum 20 toward the drum 22.

In like manner, the bar 106 acts in its normal positioning to prevent the transfer of the cards 10 from the stack 14 to the drum 18. When the coil 114 is energized by the logical circuitry shown in FIGURES 7 to 9, inclusive, the magnet 112 actuates the armature 110 to produce a pivotal movement of the bar 106 in a clockwise direction. This causes the fingers at the end of the bar 106 to move out of the slots in the drum 18 corresponding to the slots 42 in the drum 20. By moving the fingers out of the slots, the card 10 closest in the stack 14 to the drum 18 becomes released so that it can become transferred to the drum as the drum presses against the card in its rotary movement. Only one card is transferred at any one time from the stack 14 to the drum 18 because of the operation of the throat member 104 and because of the operation of certain stages shown in FIGURE 8 and hereinafter to be described in detail. The card in turn becomes transferred from the drum 18 to the drum 20 by the action of the gate 118 which operates in a manner similar to that described above for the gate 116.

The cards transferred from the stacks 12 and 14 to the drum 20 remain on the drum during the drum rotation until the cards reach the position at which the drums 20 and 22 are contiguous. The cards then move in a path dependent upon the positioning of the gate 130. In the positioning of the gate 130 shown in FIGURE 4, the fingers 160 extend at their front end into the slots 42 in the drum 20. The fingers extend into the slots 42 to a position radially interior to the cards 10 traveling on the periphery of the drum 20. By disposing the fingers radially interior to the periphery of the drum 20 in a manner similar to that shown in FIGURE 4, the fingers block the movement of the cards 10 on the periphery of the drum so that the cards are forced to move along the fingers.

Because of the disposition of the fingers 160 relative to the drums 20 and 22, the cards 10 leave the drum 20 at the forward end of the fingers and travel along the fingers to the periphery of the drum 22. This results from the tapered configuration of the fingers 160 as at 162 and from the disposition of the fingers in contiguous relationship to the drum 22 at a position laterally near the post 152. When the cards reach the drum 22, the vacuum force produced at the periphery of the drum serves to hold the cards in fixed position on the periphery of the drum as the drum rotates. The cards 10 cannot be lost during the process of transfer between a pair of adjacent drums such as the drums 20 and 22, since at least a portion of each card is forced by pressure against the periphery of a drum during the process of transfer. For example, the trailing portion of each card is pressed against the drum 20 at the beginning of the card movement along the fingers 160 of the gate 130. Subsequently, the end portions of each card are disposed on the peripheries of the drums 20 and 22 while the middle portion is moving along the tapered edges of the fingers 160. In the final stages of transfer from the drum 20 to the drum 22, the leading portion of each card 10 is pressed against the periphery of the drum 22 by the vacuum force exerted on the drum.

In a second position of the gate 130, the fingers 160 are disposed at their forward end in contiguous relationship to the periphery of the drum 22. In this position, the fingers 160 extend into the slots 42 of the drum 22 to a position radially interior to the cards 10 traveling on the periphery of the drum. Because of this disposition, the cards traveling on the drum 22 cannot move on the drum past the fingers 160. Since the fingers 160 are tapered at their top end as at 161 in a manner similar to the taper 162 provided for the fingers at their bottom end in FIGURE 4, the fingers obtain a transfer of the cards 10 from the drum 22 to the drum 20 in the second position of the fingers.

At particular times, the gate 130 is pivoted to a neutral position from its positions coupling the drums 20 and 22. The gate is pivoted to its neutral position when no current flows through either of the coils 168 and 170 in FIGURE 4. In the neutral positioning of the gate 130, the fingers 160 are disposed out of contact with the slots 42 in each of the drums 20 and 22. Since the fingers 160 are no longer positioned within the slots 42 of either of the drums 20 or 22, the cards 10 in each drum are able to rotate with the drum past the fingers. This may be seen from the relative position of the fingers 160 and the drums 20 and 22 in FIGURE 6. In this way, the gate 130 controls the movement of the card in divergent paths on the transport means in accordance with the pivotable disposition of the gate.

Upon the movement of a card 10 on the drum 22 past the gate 130, the card continues its circulation on the drum through another revolution. However, a card 10 on the drum 20 is prevented from rotating through another complete revolution by the action of the gate 172 associated with the drum 26 or the gate 177 associated with the drum 24. When the coil forming a part of the gate 177 becomes energized, it operates to pivot the finger 179 into position coupling the drums 20 and 24. This causes the cards moving with the drum 20 past the gate 130 to become transferred from the drum 20 to the drum 24. The cards then move with the drum 24 to the output stack 181 for deposit in the stack.

When the coil 178 is not energized, the gate 177 has a neutral position. This causes the cards on the drum 20 to move with the drum past the gate 177. Upon reaching the fixed gate 176, the cards become transferred by the gate from the drum 20 to the drum 26. The cards transferred to the drum 26 continue on the drum through approximately one half of a drum revolution and then become transferred to the output stack 174 by the stop 176.

The gate 130 is pivoted in accordance with the operation of the circuitry shown ni FIGURES 7, 8 and 9. The circuitry shown in FIGURES 7, 8 and 9 in turn operates in accordance with the information on the cards moving on the drum 20 past the heads such as the heads 122, 124, 126 and 128. This information may be in binary form in which an indication having first characteristics represents a binary value of "0" and an indication having second characteristics represents a binary value of "1." For example, when the information is in magnetic form, a magnetic bit of positive polarity may represent an indication of "1" and a magnetic bit of negative polarity may represent an indication of "0." Indications of "1" and "0" are illustrated schematically in the fragment of the card 10 shown in FIGURE 7.

The bits of binary information on the card 10 are disposed in a plurality of horizontal rows. One of the horizontal rows such as the bottom row of the card 10 in FIGURE 7 may have an indication of "1" in each position. By providing an indication of "1" in each position, a count is obtained as to the number of vertical columns which have been read by the heads such as the heads 124, 126 and 128. In this way, each vertical column on a card 10 is made available for selection from the other vertical columns on the cards.

The transducing member 122 reads the indications of "1" in the successive positions on the bottom horizontal row of the card 10. These indications are amplified and inverted by the amplifier 180 and are introduced as negative signals to the left input terminal of the flip-flop 188. Each signal from the amplifier 180 triggers the flip-flop 188 to produce a relatively high voltage on the left output terminal of the flip-flop.

At an intermediate time until the introduction of the next pulse position in the bottom horizontal row of the card 10, the negative signal from the amplifier 180 passes through the delay line 196. This signal then passes to the right input terminal of the flip-flop 188 and triggers the flip-flop to produce a relatively high voltage on the right output terminal of the flip-flop. In this way, the flip-flop 188 is prepared for triggering by the passage of each signal from the amplifier 180 to the left input terminal of the flip-flop. The flip-flop 188 is in effect triggered to its true state by clock signals produced by the amplifier 180 and the delay line 196 in each pulse position on the card 10 in the horizontal direction.

Every time that the voltage on the left output terminal in the flip-flop 188 changes from a high level to a low level, the count in the counter 222 is increased by an integer. This results from the construction of the counter 222 such as from a plurality of flip-flops connected in cascade arrangement. For each number, the flip-flops in the counter 222 are in an individual state of operation which is different from the pattern of flip-flop operation for any other number. For a particular count, the pattern of operation of the flip-flops in the counter 222 corresponds to the pattern of operation of the selector 220.

The operation of the counter 222 and the selector 220 may be seen from the embodiments shown in FIGURE 9. When each of the flip-flops 234, 236, 238 and 240 is triggered to a "true" state of operation, a relatively high voltage is produced on the left output terminal of the flip-flop and a relatively low voltage is produced on the right output terminal of the flip-flop. In its false state of operation, each flip-flop has a relatively high voltage on its right output terminal and a relatively low voltage on its left output terminal. As the terms are used in this application, a flip-flop is triggered to the "true" state when a triggering signal is introduced to the left input terminal of the flip-flop at the time that the flip-flop has previously been in the false state. Similarly, a flip-flop is triggered to the "false" state upon the introduction of a triggering signal to the right input terminal of the flip-flop at the time that the flip-flop has previously been in the 'true" state.

As will be seen, the movable contacts of the switches 224, 226, 228 and 230 in FIGURE 9 have relatively high voltages only when the flip-flops 234, 236, 238 and 240 have particular states of operation. For example, a relatively high voltage appears on the movable contact of the switch 224 only when the flip-flop 234 is in its "false" state of operation. Similarly, relatively high voltages are produced on the movable contacts of the switches 226, 228 and 230 only when the flip-flops 236, 238 and 240 are in their "true" state of operation.

Since the movable contacts of the switches 224, 226, 228 and 230 are connected to the "and" network 242, relatively high voltages can be simultaneously introduced to the "and" network only for a particular count in the flip-flops 234, 236, 238 and 240. This count is determined by the settings of the switches 224, 226, 228 and 230. When relatively high voltages are simultaneously introduced to the "and" network 242 from all the switches such as the switches 224, 226, 228 and 230, the "and" network passes a signal. At all other times, the "and" network 242 operates to prevent the passage of a signal.

The signal produced by the "and" network 242 results from changes in the voltage level on the output terminal of the "and" network. When relatively high voltages are simultaneously introduced to all of the input terminals in the "and" network, a relatively high voltage is produced on the output terminal of the "and" network. This high voltage changes to a low voltage upon a change in one of the input voltages from a high magnitude to a low magnitude. The resultant change in the output voltage from a high value to a low value constitutes a triggering signal for changing the state of associated flip-flops from one state to the other.

During the time that the "and" network 242 receives at least one signal of low amplitude, its output voltage is relatively low. This prevents the potential at the output terminal from changing from a high value to a low value such that a triggering signal cannot be developed at the output terminal.

The above discussion relating to the "and" network 242 can be generalized to any of the other "and" networks in the system constituting this invention.

For the particular setting of the switches 224, 226, 228 and 230 in FIGURE 9, the "and" network 242 passes a signal only upon the occurrence of a binary count of "1110," where the least significant digit is at the right. This binary count corresponds to a decimal value of "14." The signal from the "and" network 242 in FIGURE 9 would correspond to a signal from the compare network 218 in FIGURE 7.

The heads such as the heads 124, 126 and 128 in FIGURE 7 produce signals in accordance with the magnetic information recorded on the cards 10. For example, the heads 124, 126 and 128 would produce a pattern of "101" in a first position on the card 10 shown in FIGURE 7 in accordance with the magnetic pattern provided on the card. In the next position, the heads 124, 126 and 128 would produce a pattern of "010" and in the third position would produce a pattern of "011," where the least significant digit is at the right. In this discussion, the heads 124, 126 and 128 are considered as producing signals of increasing digital significance.

The signals from the heads such as the heads 124, 126 and 128 are introduced to the amplifiers such as the amplifiers 182, 184 and 186, respectively. The signals are not only amplified by the amplifiers but are also inverted in polarity and are then introduced to the left input terminals of the flip-flops 190, 192 and 194. By inverting the signals, positive signals from the heads are introduced as negative signals to the left input terminals of the flip-flops. These signals trigger the flip-flops into their "true" state of operation as represented by relatively high voltages on the left output terminals of the flip-flops.

The signals of low amplitude from the heads 124, 126 and 128 representing indications of "0" are amplified and inverted by the amplifiers 182, 184 and 186 into signals of high amplitude. The signals are then inverted by the inverters 198, 200 and 202 into signals of low amplitude and are introduced to the right input terminals of the flip-flops 190, 192 and 194, respectively. These signals trigger the flip-flops 190, 192 and 194 into their "false" states of operation as represented by relatively high voltages on the right output terminals of the flip-flops.

As will be seen, signals are produced in the flip-flops such as the flip-flops 190, 192 and 194 in accordance with the pattern of signals induced in the heads such as the heads 124, 126 and 128. The signals on the right and left output terminals of the flip-flops 190, 192 and 194 are introduced to the "and" networks 206, 208, 210, 212, 214 and 216. Since the "and" networks 206, 208, 210, 212, 214 and 216 have second input terminals connected to the output terminal of the compare network 218, the "and" networks are able to become opened only upon the introduction of a signal from the compare network 218. As previously described, the compare network 218 produces a signal only after a particular number of vertical columns on each card 10 has passed by the heads such as the heads 122, 124, 126 and 128.

The output signals from the "and" networks 206, 208, 210, 212, 214 and 216 pass to two similar banks of "and" networks. One of the banks of "and" networks is represented by the stages 246, 248, 250, 252, 254 and 256. The other bank of "and" networks is represented by the stages 270, 272, 274, 276, 278 and 280. Only one bank of "and" networks is presented for opening at any particular time. At that time, the other bank of "and" networks is closed against the passage of signals from the "and" networks 206, 208, 210, 212, 214 and 216.

The particular bank of "and" networks opened at any time is dependent upon the operation of the flip-flop 258. For example, the bank represented by the "and" networks 246, 248, 250, 252, 254 and 256 is prepared for opening when a relatively high voltage is produced on the right output terminal of the flip-flop 258. At such a time, a relatively low voltage is produced on the left output terminal of the flip-flop 258 to prevent signals from passing through the bank represented by the "and" networks 270, 272, 274, 276, 278 and 280.

In like manner, at particular times a relatively high voltage is produced on the left output terminal of the flip-flop 258. This voltage is introduced to the bank formed by the "and" networks 270, 272, 274, 276 and 280 to open the "and" networks for the passage of signals. At such times, a relatively low voltage is produced on the right output terminal of the flip-flop 258 to prevent signals from passing through the bank represented by the "and" networks 246, 248, 250, 252, 254 and 256.

The signals passing through the "and" networks 246, 248, 250, 252, 254 and 256 are introduced to the right and left input terminals of the flip-flops 260, 262 and 264. These signals trigger the flip-flops 260, 262 and 264 into a pattern of operation corresponding to the pattern of operation of the flip-flops 190, 192 and 194. In this way, the indications in a particular vertical column of the card 10 becomes transferred to the flip-flops 260, 262 and 264 to represent particular information. As will be described in detail subsequently, this information will control the passage of cards to the output stack 174 in FIGURE 1.

In like manner, the signals passing through the "and" networks 270, 272, 274, 276, 278 and 280 are introduced to the right and left input terminals of the flip-flops 284, 286 and 288. These signals trigger the flip-flops 284, 286 and 288 into a pattern of operation corresponding to the pattern of the flip-flops 190, 192 and 194. In this way, the indications in a particular vertical column of a card 10 becomes transferred to the flip-flops 284, 286 and 288 so as to be made available for subsequent use in the apparatus constituting this invention.

Since signals can only pass to the flip-flops 260, 262 and 264 or to the flip-flops 284, 286 and 288 at a particular position for each card 10, only one bank of flip-flops can receive this information for each card. The other bank of flip-flops continues in its previous state of operation. For example, the flip-flops 260, 262 and 264 can receive different information from the "and" networks 246, 248, 250, 252, 254 and 256 when a relatively high voltage is produced on the right output terminal of the flip-flop 258. At such times, the operation of the flip-flops 284, 286 and 288 cannot become changed. This results from the fact that a relatively low voltage is produced on the left output terminal of the flip-flop 258 to prevent signals from passing to the "and" networks 270, 272, 274, 276, 278 and 280.

The signals from the flip-flops 260, 262 and 264 and from the flip-flops 284, 286 and 288 are introduced to the comparator 266. The comparator 266 is shown in block form since its construction and operation are well known in the art. The operation of the comparator will also be seen from the subsequent discussion and from the logical equations which will be developed hereinafter. It is believed that a person skilled in the art would be able to build a suitable comparator for use in the system constituting this invention from the logical equations set forth hereinafter.

The comparator 266 compares the voltages introduced to it from the flip-flops 260, 262, 264 and from the flip-flops 284, 286 and 288. When the information stored in the flip-flops represents numerical values, the comparator 266 determines whether the number stored in the flip-flops 260, 262 and 264 is less than, equal to or greater than the numbers stored in the flip-flops 284, 286 and 288. Similarly, the comparator 266 may operate to determine if an alphabetic letter stored in the flip-flops 260, 262 and 264 precedes, corresponds to, or follows a letter in the alphabet as represented by the pattern of operation of the flip-flops 284, 286 and 288.

The comparator 266 operates to make the determinations described in the previous paragraph by comparing the pattern of operation in corresponding flip-flops in each of the two banks represented by the flip-flops 260, 262 and 264 and by the flip-flops 284, 286 and 288. For example, the operation of the flip-flops 260 and 284 is compared. Similarly, the patterns of operation of the flip-flops 262 and 264 are respectively compared with the patterns of operation of the flip-flops 286 and 288. The results of the comparison between each pair of flip-flops are then used to provide a final comparison using all of the results obtained.

When numerical information is being stored on the cards 10, the comparator 266 operates to produce a signal on the output line 294 when the signal information produced in the flip-flops 284, 286 and 288 has a numerical value greater than the value of the signal information produced in the flip-flops 260, 262 and 264. The operation of the comparator 266 may be expressed as:

$$X = i_3 i_3' + (i_3 i_3 + i_3' j_3')(i_2 j_2' + [i_2 j_2 + i_2' j_2'] i_1 j_1') \quad (1)$$

where:
$j_1$ = a relatively high voltage on the left output terminal of the flip-flop 260;
$j_1'$ = a relatively high voltage on the right output terminal of the flip-flop 260;
$j_2$ and $j_3$ = relatively high voltages on the left output terminals of the flip-flops 262 and 264, respectively;
$j_2'$ and $j_3'$ = relatively high voltages on the right output terminals of the flip-flops 262 and 264, respectively;
$i_1$, $i_2$ and $i_3$ = relatively high voltages on the left output terminals of the flip-flops 284, 286 and 288, respectively;
$i_1'$, $i_2'$ and $i_3'$ = relatively high voltages on the right output terminals of the flip-flops 284, 286 and 288, respectively;
"+" = an "or" proposition in which a signal is produced when any of the two or more propositions covered by the "or" proposition is true; and
$X$ = a signal on the line 294 to indicate that the number stored in the flip-flops 284, 286 and 288 is greater than the number stored in the flip-flops 260, 262 and 264.

The output from the flip-flops 260, 262 and 264 may sometimes have a greater value than the output from the flip-flops 284, 286 and 288. At such times, a signal is produced by the comparator 266 for introduction to the line 290. The introduction of signals from the comparator 266 to the line 290 may be logically expressed as:

$$Y = [j_3 i_3' + (j_3 i_3 + j_3' i_3')][j_2 i_2' + [i_2 j_2 + i_2' j_2'] j_1 i_1'] \quad (2)$$

where $Y$ = a signal on the line 290 to indicate that the number stored in the flip-flops 260, 262 and 264 is greater than the number stored in the flip-flops 284, 286 and 288; and the other terms have previously been defined.

At other times, the output from the flip-flops 260, 262 and 264 may be equal to the output from the flip-flops 284, 286 and 288. Upon the occurrence of equal outputs from the flip-flops 260, 262 and 264 and from the flip-flops 284, 286 and 288, an output signal is introduced from the comparator 266 to the line 292. This signal may be produced in accordance with the logical equation:

$$Z = (i_3 j_3 + i_3' j_3')(i_2 j_2 + i_2' j_2')(i_1 j_1 + i_1' j_1') \qquad (3)$$

where $Z=$a signal on the line 292 to indicate that the number stored in the flip-flops 260, 262 and 264 is equal to the number stored in the flip-flops 284, 286 and 288; and the other terms have previously been defined.

The operation of the circuitry shown in FIGURE 8 may perhaps be seen best from a discussion of specific examples. When the switch 314 is closed, the operation of the system shown in FIGURE 8 is initiated. Since a positive potential is now applied from the voltage source 310 to the various components, a transient surge of voltage from the source 310 passes as a positive signal through the capacitance 333 to the differentiator 332. The differentiator 332 sharpens the transient surge of current passing through the capacitance 333 to produce a triggering signal.

The signal from the differentiator 332 passes through the "or" network 358 to the left input terminal of the flip-flop 258 and triggers the flip-flop to its "true" state, as represented by a relatively high voltage on the left output terminal of the flip-flop. The triggering signal from the differentiator 332 is also introduced through the "or" network 335 to the right input terminal of the flip-flop 334. This signal triggers the flip-flop 334 to its "false" state, as represented by a relatively high voltage on the right output terminal of the flip-flop and a relatively low voltage on the left output terminal of the flop-flop. Since a low voltage is produced on the left output terminal of the flip-flop 334, the tube 338 is maintained in its nonconductive state. This prevents current from flowing through the coil 102 such that the gate 90 remains in the position shown in FIGURES 1 and 2. By maintaining the gate 90 in the position shown in FIGURES 1 and 2, cards cannot be removed by the drum 16 from the input stack 12.

In addition to passing through the "or" network 358 to the left input terminal of the flip-flop 258, the triggering signal from the differentiator 332 passes through the "or" network 358 to the left input terminal of the flip-flop 360. The signal triggers the flip-flop 360 to produce a relatively high voltage on the left output terminal of the flip-flop. This voltage is introduced to the grid of the tube 366 to make the tube conductive. When the tube 366 becomes conductive, current flows through a circuit including the voltage source 310, the switch 314, the resistance 370, the coil 114 and the tube to ground. The current flowing through the coil 114 causes the magnet 112 in FIGURE 1 to actuate the bar 106 out of engagement with the slots 42 in the drum 18. Since the bar 106 no longer impedes the movement of cards on the periphery of the drum 18, the drum is able to remove the first card in the input stack 14.

The triggering signal from the differentiator 332 (FIGURE 8) passes through the "or" network 358 to the delay line 364 as well as to the left input terminal of the flip-flop 360. The signal passes through the delay line 364 after a particular period of time corresponding to the time required for the drum 18 to remove the first card from the input stack 14. At such a time, the signal from the delay line 364 is introduced to the right input terminal of the flip-flop 360 to trigger the tube into its false state of operation. This state of operation is represented by the production of a relatively high voltage on the right output terminal of the flip-flop 360 and a relatively low voltage on the left output terminal of the flip-flop.

The low voltage produced on the left output terminal of the flip-flop 360 causes the tube 366 to become cut off so that current is no longer able to flow through the coil 114 and the tube. Upon such an occurrence, the spring 108 in FIGURE 1 pivots the bar 106 in a counterclockwise direction in FIGURE 1 to return the bar into cooperative relationship with the drum 18. This prevents any further cards other than the first card from being removed from the input stack 14.

When the first card in the input stack 14 is removed from the stack by the drum 18, the card travels on the periphery of the drum in accordance with the drum rotation until the card reaches the gate 118 in FIGURE 1. The card then becomes transferred from the drum 18 to the drum 20 by the action of the gate 118, as described in detail previously. After being transferred to the drum 20, the card travels on the periphery of the drum past the heads such as the heads 122, 124, 126 and 128 in FIGURE 7. At a particular vertical column on the card dependent upon the setting of the compare network 218 in FIGURE 7, the signals induced in the heads 124, 126 and 128 pass through the "and" networks 206, 208, 210, 212, 214 and 216. The operation of the "and" networks in passing the signals in only a selected vertical column on each card 10 has been described in detail previously.

The signals from the "and" networks 206, 208, 210, 212, 214 and 216 pass through the bank of "and" networks represented by the networks 270, 272, 274, 276, 278 and 280. This results from the fact that the latter plurality of "and" networks have been prepared for opening by a relatively high voltage on the left output terminal of the flip-flop 258. The signals passing through the "and" networks 270, 272, 274, 276, 278 and 280 trigger the flip-flops 284, 286 and 288 to a pattern of operation representing the signals induced in the heads 124, 126 and 128. For purposes of subsequent discussion, the signals produced in the flip-flops 284, 286 and 288 may have a decimal value of "2" as represented by a binary pattern of "010," where the least significant digit is at the right. This would cause the flip-flop 286 to have a "true" state of operation and the flip-flops 284 and 288 to have "false" states of operation. As previously described, the flip-flops 284, 286 and 288 receive signal information representing digits of increasing significance.

The triggering signal from the differentiator 332 is introduced through "or" networks to the right input terminals of the flip-flops 260, 262 and 264. These "or" networks are not shown in FIGURE 7 for purposes of simplicity. However, it is believed that a person skilled in the art would understand the connections from prior discussion and from similar connections which are shown in the drawings. The signals from the differentiator 332 trigger the flip-flops 260, 262 and 264 to their "false" states of operation.

Since the flip-flops 260, 262 and 264 are in their "false" states of operation as represented by relatively high voltages on the right output terminals of the flip-flops, an indication as to a decimal value of "0" is initially provided by the flip-flops. For this reason, the flip-flops 260, 262 and 264 indicate a decimal value of "0" at the same time that the flip-flops 284, 286 and 288 are indicating a decimal value of "2" as a result of the information on the first card from the input stack 14. This causes a relatively high voltage to be introduced by the comparator 266 to the output line 294 in accordance with the logic expressed above in Equation 1.

The signals in the output line 294 are introduced to the "and" network 300. The signals pass through the "and" network 300 because of the relatively high voltage introduced to the "and" network from the left output terminal of the flip-flop 258. The signals pass through the "or" network 302 to the left input terminal of the flip-flop 304 and trigger the flip-flop to its true state of operation as represented by a relatively high voltage on the left output terminal of the flip-flop. This high voltage is introduced to the grid of the tube 306 to make the tube conductive. This causes current to flow through a circuit including the voltage source 310, the switch 314, the resistance 312, the coil 170 and the tube 306 to ground. Because of the flow of current through the coil 170, the gate 130 is actuated into position for obtaining a transfer of cards from the drum 22 to the drum 20. No card is actually transferred from the drum 22 to the drum 20 since no card was previously circulating on the drum.

After a particular period of time, the signal from the "or" network 302 passes through the delay line 305 to the right input terminal of the flip-flop 304. The signal triggers the flip-flop 304 to its "false" state as represented by a relatively high voltage on the right output terminal of the flip-flop and a relatively low voltage on the left output terminal of the flip-flop. The low voltage on the left output terminal of the flip-flop 304 causes the tube 306 to become cut off and the flow of current through the coil 170 and the tube to become interrupted. Since current no longer flows through the coil 170, the gate 130 returns to its neutral position shown in FIGURE 6.

The signal from the "or" network 302 passes through the delay line 316 at approximately the same time as or slightly after the passage of the signal through the delay line 305. The signal passing through the delay line 316 triggers the flip-flop 318 to produce a relatively high voltage on the left output terminal of the flip-flop. This high voltage is introduced to the grid of the tube 324 to make the tube conductive such that current flows through a circuit including the voltage source 310, the switch 314, the resistance 328, the coil 168 and the tube to ground. The current flowing through the coil 168 causes the gate 130 to be actuated into position for obtaining a transfer of the cards 10 from the drum 20 to the drum 22. In this way, the card 10 previously withdrawn by the drum 18 from the input stack 14 becomes transferred from the drum 20 to the drum 22.

After the card 10 has been transferred from the drum 20 to the drum 22, the signal from the "or" network 302 passes through the delay line 320 to the right input terminal of the flip-flop 318. The signal triggers the flip-flop 318 to produce a relatively high voltage on the right output terminal of the flip-flop and a low voltage on the left output terminal of the flip-flop. The low voltage on the left output terminal of the flip-flop 318 causes the tube 324 to become cut off and the flow of current through the coil 168 to become interrupted. Since the coil 168 is no longer energized, the gate 130 returns to its neutral position. This causes the card 10 transfered to the drum 22 to circulate on the drum.

In addition to passing to the flip-flops 304 and 318, the signals on the line 294 pass through the "or" network 330 to the right input terminal of the flip-flop 258. The signals trigger the flip-flop 258 to produce a relatively high voltage on the right output terminal of the flip-flop and a relatively low voltage on the left output terminal of the flip-flop. The signals in the line 294 are also introduced through the "or" network 330 to the left input terminal of the flip-flop 334. The signals trigger the flip-flop 334 for the production of a relatively high voltage on the left output terminal of the flip-flop. This voltage is introduced to the grid of the tube 338 to make the tube conductive.

When the tube 338 becomes conductive, current flows through a circuit including the voltage source 310, the switch 314, the resistance 342, the coil 102 and the tube 338 to ground. The current flowing through the coil 102 causes the bar 92 to be pivoted in a clockwise direction in FIGURES 1 and 2 out of its position within the slots 42 in the drum 16. By pivoting the bar 92 in this manner, the drum 16 is able to remove the first card in the stack 12.

After the first card in the stack 12 has been removed by the drum 16 from the stack, the signal in the line 294 passes through the "or" network 330, the delay line 336 and the "or" network 335 to the right input terminal of the flip-flop 334. This signal triggers the flip-flop 334 to produce a relatively high voltage on the right output terminal of the flip-flop and a relatively low voltage on the left output terminal of the flip-flop. The low voltage on the left output terminal of the flip-flop 334 causes the tube 338 to become cut off and the flow of current through the coil 102 to become interrupted. The bar 92 then pivots in a counterclockwise direction in FIGURES 1 and 2 under the action of the spring 96 so as to return to its normal position within the slots 42 in the drum 16. This prevents any further cards from being removed from the input stack 12 by the drum 16.

Upon the transfer of the first card 10 in the input stack 12 to the drum 16, the card travels with the drum until it reaches the gate 116 in FIGURE 1. The gate 116 then acts to obtain a transfer of the card from the drum 16 to the drum 20. After being transferred to the drum 20, the card moves on the periphery of the drum past the gate 118. The gate 118 has no effect on the card since it operates only to transfer cards from the drum 18 to the drum 20. The cards then move past the heads such as the heads 122, 124, 126 and 128.

At a selective position on the card 10 transferred to the drum 20 from the input stack 12, signals are induced in the heads 124, 126 and 128 in a pattern representing the information at the selective position. These signals trigger the flip-flops 190, 192 and 194 in FIGURE 7 in a pattern corresponding to the signals induced in the heads. The signals produced in the flip-flops 190, 192 and 194 pass through the "and" networks 206, 208, 210, 212, 214 and 216 since the "and" networks become prepared for opening at the selective position by a signal from the compare network 218. The signals then pass through the "and" networks 246, 248, 250, 252, 254 and 256 because of the relatively high voltage produced on the right output terminal of the flip-flop 258. After passing through the "and" networks 246, 248, 250, 252, 254 and 256, the signals trigger the flip-flops 260, 262 and 264 in a pattern corresponding to the pattern of signals induced in the heads 124, 126 and 128 at the selective position.

By way of illustration, the signals produced in the flip-flops 260, 262 and 264 may have a pattern of "001," where the least significant digit is at the right. The flip-flops 260, 262 and 264 respectively produce the indications of "1," "0" and "0" to represent the digits of increasing significance. This pattern of signal indications represents a decimal value of "1." The pattern of signals produced in the flip-flops 260, 262 and 264 is compared in the comparator 266 with the pattern of signals previously produced in the flip-flops 284, 286 and 288 to represent a decimal value of "2." Since the numerical indications produced in the flip-flops 260, 262 and 264 are less than the numerical indications in the flip-flops 284, 286 and 288, an output signal is produced by the comparator 266 for introduction to the line 294.

The signal introduced to the line 294 from the comparator 266 passes to the "and" network 300. However, the signal is not able to pass through the "and" network 300 because of the simultaneous introduction of a relatively low voltage to the "and" network from the left output terminal of the flip-flop 258. Since no signal is able to pass through the "and" network 300, the flip-flops 304 and 318 cannot become actuated to obtain a transfer of cards between the drums 20 and 22. This causes the card previously transferred to the drum 22 to continue its circulation on the drum. It also causes the card just transferred to the drum 20 from the input stack 12 to continue its movement with the drum past the gate 130 toward the drums 24 and 26.

The card 10 on the drum 20 continues its movement past the gate 177 disposed between the drums 20 and 24. The card continues its movement past the gate 177 since the gate is not pivoted from its neutral position to a position coupling the drums 20 and 24 by the introduction of a triggering signal to the flip-flop 348. The card moves to the gate 172, which operates to transfer the card from the drum 20 to the drum 26.

After becoming transferred to the drum 26, the card moves with the drum until it reaches the stop 176, which acts upon the card to position the card within the output stack 174. As will become more apparent subsequently, the movement of the card to the output stack 174 is in accordance with the desired pattern of operation. The reason for this is that all of the cards in the stack 12 not having information the same as the information on cards in the stack 14 are desired to be collected in the output stack 174.

In addition to being introduced to the "and" network 300, the signal in the line 294 is introduced to the "or" network 330. The signal from the line 294 passes through the "or" network 330 to the right input terminal of the flip-flop 258. The signal has no effect on the flip-flop 258 since the flip-flop is already in its false state of operation, as represented by a relatively high voltage on the right output terminal of the flip-flop. The signal in the line 294 is also introduced through the "or" network 330 to the left input terminal of the flip-flop 334. The signal triggers the flip-flop 334 to produce a relatively high voltage on the left output terminal of the flip-flop.

The relatively high voltage on the left output terminal of the flip-flop 334 makes the tube 338 conductive and causes current to flow through a circuit including the voltage source 310, the switch 314, the resistance 342, the coil 102 and the tube to ground. By energizing the coil 102, the gate 90 becomes pivoted out of its co-operative relationship with the drum 16 so that the next card in the input stack 12 can be withdrawn by the drum from the stack. Only one card is withdrawn by the drum 16 from the stack 12 since the flip-flop 334 becomes triggered to its false state at the end of this time by the passage of a signal through the delay line 336 and the "or" network 335.

When the second card in the input stack 12 becomes withdrawn from the stack by the drum 16, it moves with the drum to the gate 116. The gate 116 operates to transfer the card to the drum 20 and the card moves along the drum 20 past the gate 118 and the heads such as the heads 122, 124, 126 and 128. As the card 10 moves past the heads 124, 126 and 128, signals are produced in the flip-flops 190, 192 and 194 in accordance with the magnetic information previously recorded on the card. At the selective position on the card dependent upon the setting of the compare network 218, the signals produced in the flip-flops 190, 192 and 194 pass through the "and" networks 206, 208, 210, 212, 214 and 216 to the "and" networks 246, 248, 250, 252, 254 and 256.

The signals are able to pass through the "and" networks 246, 258, 250, 252, 254 and 256 since the "and" networks are prepared for opening by a relatively high voltage on the right output terminal of the flip-flop 258. The signals then pass to the flip-flops 260, 262 and 264 and trigger the flip-flops into a pattern of operation corresponding to the magnetic information in the card 10 at the selective position. The new signals produced in the flip-flops 260, 262 and 264 replace the signals previously recorded in the flip-flops to indicate a decimal value of "1."

By way of illustration, the signals produced in the flip-flops 260, 262 and 264 may have a pattern of "010" to indicate a decimal value of "2." For such a pattern of operation, the flip-flops 260, 262 and 264 respectively produce indications of "0," "1" and "0" to represent the digits of increasing significance. This pattern of operation of the flip-flops 260, 262 and 264 corresponds to the pattern of operation previously produced and still existing in the flip-flops 284, 286 and 288. For this reason, the comparator 266 operates to introduce an output signal to the line 292 in accordance with the logic expressed above in Equation 3.

The signal on the line 292 is introduced to the "and" network 298. However, the signal is unable to pass through the "and" network 298 because of the introduction of a relatively low voltage to the "and" network from the left output terminal of the flip-flop 258. This prevents the gate 130 from becoming pivoted into a position to couple the drums 20 and 22. Because of this, the card previously introduced to the drum 22 from the input stack 14 continues to circulate on the drum. Since the drums 20 and 22 are not coupled by the gate 130, the card introduced to the drum 20 from the input stack 12 moves with the drum past the gate 130 and toward the drums 24 and 26.

In addition to passing to the "and" network 298, the signal in the line 292 passes through the "or" network 346 to the left input terminal of the flip-flop 348. The signal triggers the flip-flop 348 to its true state as represented by a relatively high voltage on the left output terminal of the flip-flop. This voltage is introduced to the grid of the tube 352 to make the tube conductive. When the tube 352 becomes conductive, current flows through a circuit including the voltage source 310, the switch 314, the resistance 356, the coil 178 and the tube to ground. The flow of current through the coil 178 causes the gate 177 to become actuated into a position for coupling the drum 20 to the drum 24.

By coupling the drum 20 to the drum 24, the card on the drum 20 becomes transferred to the drum 24. The card then moves with the drum 24 until it reaches the output stack 181 and becomes deposited in the stack. The card becomes deposited in the output stack 181 since it has information corresponding to the information on a card from the input stack 14. In this way, certain cards from the input stack 12 become mixed in the output stack 181 with all of the cards from the input stack 14.

After a time sufficient for the card on the drum 20 to become transferred to the drum 24, the signal from the "or" network 346 passes through the delay line 350 to the right input terminal of the flip-flop 348. The signal triggers the flip-flop 348 for the production of a relatively high voltage on the right output terminal of the flip-flop and a relatively low voltage on the left output terminal of the flip-flop. The low voltage on the left output terminal of the flip-flop 348 cuts off the flow of current through the tube 352 and the coil 178. Since the coil 178 is no longer energized, the gate 177 returns to its neutral position such that the drum 20 becomes uncoupled from the drum 24. This prevents any further cards from being transferred from the drum 20 to the drum 24.

Actually, the gate 177 can return to its neutral position even before the card has become transferred from the drum 20 to the drum 24. This results from the fact that the drums 20 and 24 rotate in a direction for producing such a transfer after at least a portion of the card has become positioned on the periphery of the drum.

The signal in the line 292 is introduced to the "or" network 330 as well as to the "and" network 298 and the "or" network 346. The signal passes through the "or" network 330 to the right input terminal of the flip-flop 258. The signal has no effect on the operation of the flip-flop 258 since the flip-flop is already in its false state of operation. The signal from the "or" network 330 also passes to the left input terminal of the flip-flop 334 and triggers the flip-flop to produce a relatively high voltage on the left output terminal of the flip-flop. This high voltage causes the tube 338 to become conductive and the coil 102 to become energized in a manner similar to that described above. By energizing the coil 102, the gate 90 becomes pivoted to a position in which the drum 16 is able to withdraw the next card from the input stack 12.

After the card has been withdrawn by the drum 16 from the input stack 12, the signal in the line 292 passes through the "or" network 330 and the delay line 336 and triggers the flip-flop 334 to its false state of operation. This causes the tube 338 to become cut off and the coil 102 to become de-energized. When the coil 102 becomes de-energized, the gate 90 returns to its position blocking the withdrawal of any further cards by the drum 16 from the input stack 12.

The card transferred to the drum 16 from the input stack 12 moves with the drum until it reaches the gate 116. The card becomes transferred by the gate 116 to the drum 20 and is moved past the gate 118 to the heads such as the heads 122, 124, 126 and 128 in accordance with the drum rotation. Signals are induced in the heads such as the heads 124, 126 and 128 in a pattern related to the pattern of magnetic information on the card moving past the heads. These signals produce corresponding patterns of signals in the flip-flops 190, 192 and 194 in FIGURE 7. At the selective position dependent upon the setting of the "compare" network 218, the signals from the flip-flops 190, 192 and 194 pass through the "and" networks 206, 208, 210, 212, 214 and 216.

The signals from the "and" networks 206, 208, 210, 212, 214 and 216 pass through the "and" networks 246, 248, 250, 252, 254 and 256 because of the simultaneous introduction of a relatively high voltage from the right output terminal of the flip-flop 258 to the latter group of "and" networks. The signals from the "and" networks 246, 248, 250, 252, 254 and 256 trigger the flip-flops 260, 262 and 264 into a pattern of operation related to the magnetic information on the card 10 at the selective positions. The pattern of signals produced in the flip-flops 260, 262 and 264 replaces the signals previously produced in the flip-flops.

The signals produced in the flip-flops 260, 262 and 264 may have a pattern of "011" where the least significant digit is at the right. Such a pattern of operation represents a decimal value of "3." For such a pattern of operation, the flip-flops 260, 262 and 264 respectively produce signals of "1," "1," and "0" to represent digits of increasing significance. These signals are compared in the comparator 266 with the signals previously produced in the flip-flops 284, 286 and 288 to represent a decimal value of "2." Since the signals produced in the flip-flops 284, 286 and 288 have a numerical value less than the signals produced in the flip-flops 260, 262 and 264, an output signal is introduced from the comparator 266 to the line 290.

The signal in the line 290 is introduced to the "and" network 296. The signal in the line 290 passes through the "and" network 296 because of the simultaneous introduction of a high voltage to the "and" network from the right output terminal of the flip-flop 258. The signal then passes through the "or" network 302 to the left input terminal of the flip-flop 304 and triggers the flip-flop to its true state, as represented by a relatively high voltage on the left output terminal of the flip-flop. This high voltage is introduced to the grid of the tube 306 to make the tube conductive and to energize the coil 170.

When the coil 170 becomes energized, the gate 130 becomes pivoted into position for transferring the card on the drum 22 to the drum 20. After the card on the drum 22 has become transferred to the drum 20, the flip-flop 304 becomes triggered to its false state by the passage of a signal through the delay line 305. This causes the tube 306 to become cut off and the coil 170 to become de-energized. Since the coil 170 is de-energized, the gate 130 returns to its neutral state to prevent any further transfer of cards from the drum 22 to the drum 20.

The signal from the "and" network 296 passes through the delay line 316 shortly after its passage through the delay line 305. The signal passing through the delay line 316 triggers the flip-flop 318 to produce a relatively high voltage on the left output terminal of the flip-flop. The high voltage on the left output terminal of the flip-flop 318 is introduced to the grid of the tube 324 to make the tube conductive and to produce a flow of current through the coil 168 and the tube. Upon a flow of current through the coil 168, the gate 130 becomes pivoted into the position shown in FIGURE 4. In this position, the gate 130 operates to obtain a transfer of the gate on the drum 20 to the drum 22. In this way, a card originally obtained from the input stack 14 becomes replaced on the drum 22 by a card originally obtained from the input stack 12.

After the transfer of the card on the drum 20 to the drum 22, the signal from the delay line 316 passes through the delay line 320 to the right input terminal of the flip-flop 318. The signal triggers the flip-flop 318 for the production of a relatively high voltage on the right output terminal of the flip-flop and a relatively low voltage on the left output terminal of the flip-flop. The low voltage on the left output terminal of the flip-flop 318 cuts off the tube 324 and de-energizes the coil 168. When the coil 168 becomes de-energized, the gate 130 returns to a neutral position to prevent any further transfer of cards from the drum 20 to the drum 22.

The signal in the line 290 is introduced to the "or" network 346 as well as to the "and" network 296. The signal passes through the "or" network 346 to the left input terminal of the flip-flop 348 and triggers the flip-flop for the production of a relatively high voltage on the left output terminal of the flip-flop. This high voltage is introduced to the grid of the tube 352 to make the tube conductive. Current then flows through a circuit including the voltage source 316, the switch 314, the resistance 356, the coil 178 and the tube 352.

Upon the flow of current through the coil 178, the gate 177 becomes pivoted into position for transferring the card on the drum 20 to the drum 24. This card was previously transferred from the drum 22 to the drum 20 in accordance with the operation of the circuits described above. After being transferred from the drum 20 to the drum 24, the card continues its movement on the drum 24 to the output stack 181 for depositing in the stack.

Only one card can be transferred from the drum 20 to the drum 24 for deposit in the output stack 181. The reason for this is that the flip-flop 348 becomes triggered to its false state by the passage of a signal through the delay line 350 after the transfer of the card from the drum 20 to the drum 24. The card becomes deposited in the output stack 181 since it was originally obtained from the input stack 14. As previously described, it is desired in this embodiment to deposit in the output stack 181 all of the cards originally obtained from the input stack 14.

In addition to passing to the "and" network 296 and the "or" network 346, the signal in the line 290 is introduced to the "or" network 358. The signal passes through the "or" network 358 to the left input terminal of the flip-flop 258. The signal triggers the flip-flop 258 for the production of a relatively high voltage on the left output terminal of the flip-flop. The signal also passes through the "or" network 358 to the left input terminal of the flip-flop 360 and triggers the flip-flop to its true state, the production of a relatively high voltage on the left output terminal of the flip-flop. The high voltage on the left output terminal of the flip-flop 360 makes the tube 366 conductive to produce a flow of current through the coil 114 and the tube.

The gate 105 becomes actuated to a position away from the drum 18 upon the flow of current through the coil 114. This causes the next card in the input stack 14 to be withdrawn by the drum 18 from the stack. After the withdrawal of the card from the stack 14, the flip-flop 360 becomes triggered to its false state by the passage of a signal through the delay line 364. In the false state of operation of the flip-flop 360, the tube 366 becomes cut off and the coil 114 becomes de-energized to prevent any further withdrawal of cards by the drum 16 from the input stack 14.

The card withdrawn by the drum 18 from the input stack 14 is subsequently transferred to the drum 20 by the gate 118. The card then moves past the heads such as the heads 122, 124, 126 and 128 for the induction of signals in the heads and the production in the flip-flops 190, 192 and 194 of signals having a pattern corresponding to the pattern of magnetic signals in the heads. In the selective position on the card, the signals in the flip-flops 190, 192 and 194 pass through the "and" networks 206, 208, 210, 212, 214 and 216 in FIGURE 7 because of the introduction of a high voltage to the "and" networks from the compare network 218. The signals then pass through the "and" networks 270, 272, 274, 276, 278 and 280 since the "and" networks have become prepared for opening by a relatively high voltage on the left output terminal of the flip-flop 258.

The signals passing through the "and" networks 270, 272, 274, 276, 278 and 280 trigger the flip-flops 284, 286 and 288 to a pattern of operation corresponding to the signals induced in the heads 124, 126 and 128 at the selective position on the card. The signals produced in the flip-flops 284, 286 and 288 replace the signals previously produced in the flip-flops to represent a decimal value of "2." The signals produced in the flip-flops 284, 286 and 288 may have a pattern of "011" where the least significant digit is at the right. This pattern of operation may represent a decimal value of "3" and corresponds to the pattern of the signal indications in the flip-flops 260, 262 and 264. For such a pattern of operation, the flip-flops 284, 286 and 288 respectively produce signal indications of "1," "1" and "0" to represent digits of increasing significance.

Since the flip-flops 284, 286 and 288 have a pattern of operation corresponding to that of the flip-flops 260, 262 and 264, a signal is produced by the comparator 266 for introduction to the line 292. This signal passes through the "and" network 298 since the "and" network has been prepared for opening by a relatively high voltage on the left output terminal of the flip-flop 258. The signal passes through the "or" network 302 to the left input terminal of the flip-flop 304 and triggers the flip-flop to its true state. This causes the tube 306 to become conductive and the coil 170 to become energized in a manner similar to that described above.

When the coil 170 becomes energized, the gate 130 becomes pivoted to a position coupling the drum 22 to the drum 20 for a transfer of the card on the drum 22 to the drum 20. The card transferred from the drum 22 to the drum 20 then moves with the drum 20 toward the drums 24 and 26. After the transfer of the card to the drum 20, the flip-flop 304 becomes triggered to its false state by the passage of a signal through the delay line 305 so as to cut off the tube 306 and de-energize the coil 170. Since the coil 170 becomes de-energized, the gate 130 returns to a neutral position.

Upon the transfer of the card on the drum 22 to the drum 20, the signal from the "and" network 298 passes through the "or" network 302 and the delay line 316 to the left input terminal of the flip-flop 318. The signal triggers the flip-flop 318 to produce a relatively high voltage on the left output terminal of the flip-flop. This high voltage is introduced to the grid of the tube 324 to produce a flow of current through the coil 168 and the tube.

The gate 130 becomes actuated by the flow of current through the coil 168 and becomes pivoted to a position for obtaining a transfer of the card on the drum 20 to the drum 22. Upon the transfer of the card on the drum 20 to the drum 22, the flip-flop 318 becomes triggered to a false state by the passage of a signal through the delay line 320. This causes the tube 324 to become cut off and the coil 168 to become de-energized for a return of the gate 130 to its neutral state. The card transferred to the drum 22 from the drum 20 then circulates on the drum 22 through one or more complete revolutions.

As will be seen from the previous paragraph, the card originally transferred to the drum 22 from the input stack 14 is transferred from the drum 22 to the drum 20 for movement with the drum 20 toward the drums 24 and 26. As the card approaches the drum 24, the signal in the line 292 passes through the "or" network 346 to the left input terminal of the flip-flop 348. The signal triggers the flip-flop 348 to produce a relatively high voltage on the left output terminal of the flip-flop. This voltage makes the tube 352 conductive and produces a flow of current through the coil 178 and the tube.

Upon a flow of current through the coil 178, the gate 177 becomes actuated to a position coupling the drums 20 and 24 such that the card becomes transferred from the drum 20 to the drum 24. The card then moves with the drum 24 and subsequently becomes transferred to the output stack 181. Only one card can be transferred from the drum 20 to the drum 24 for movement to the output stack since the flip-flop 348 is triggered to its false state by the passage of a signal through the delay line 350. The card is transferred to the output stack 181 since it has information corresponding to that on a card from the input stack 14. Because of this correspondence of information, the card is properly transferred to the output stack 181 even though it was originally obtained from the input stack 12.

In addition to passing the "and" network 296 and the "or" network 346, the signal in the line 292 passes to the "or" network 330. This signal is introduced through the "or" network 330 to the right input terminal of the flip-flop 258. The signal triggers the flip-flop 258 to produce a relatively high voltage on the right output terminal of the flip-flop and a relatively low voltage on the left output terminal of the flip-flop.

The signal from the line 292 also passes through the "or" network 330 to the left input terminal of the flip-flop 334. The signal triggers the flip-flop 334 to its true state, as represented by a relatively high voltage on the left output terminal of the flip-flop. This voltage makes the tube 338 conductive such that current flows through the coil 102 and the tube. The current flowing through the coil 102 causes the gate 90 to become actuated to a position away from the drum 16. When this occurs, the drum 16 is able to withdraw the next card in the stack 12.

The next card withdrawn by the drum 16 from the stack 12 may have at the selective positions a value corresponding to the value provided at the selective positions on the card transferred from the drum 20 to the drum 22. This causes the comparator 266 to produce a signal for introduction to the line 292. The signal in the line 292 is not able to pass through the "and" network 298 since a relatively high voltage is not introduced to the "and" network from the left output terminal of the flip-flop 258. This prevents the card on the drum 22 from being transferred to the drum 20 and the card on the drum 20 from being transferred to the drum 22. Because of this, the card on the drum 20 continues its movements with the drum 20 past the gate 130 toward the drum 24.

The signal in the line 292 passes through the "or" network 346 and triggers the flop-flop 348 to its true state. This makes the tube 352 conductive and causes the coil 178 to be energized for actuating the gate 177 into position for transferring the card on the drum 20 to the drum 24. In this way, the card becomes deposited in the output stack 181. This is in accordance with the desired pattern of operation even though the card transferred to the stack 181 was originally obtained from the stack 12. The reason is that it is desired to deposit in the output stack 181 all of the cards in the stack 12 having information corresponding to cards in the stack 14.

The signal in the line 292 also passes through the "or" network 330 to the right input terminal in the flip-flop 258. This signal has no effect on the flip-flop 258 since the flip-flop is already in its false state of operation. The signal in the line 292 also passes to the flip-flop 334 and triggers the flip-flop to its true state. This causes the tube 338 to become conductive and the coil 102 to become energized. By energizing the coil 102, the gate 90 becomes actuated so that the next card in the stack 12 can be withdrawn by the drum 16 from the stack.

The next card withdrawn by the drum 16 from the stack 12 may have a decimal value of "4," as represented by a binary pattern of 100, where the least significant digit is on the right. Since the card previously withdrawn from the stack 14 has a decimal value of "3," a signal passes from the comparator 266 to the line 290 in FIGURE 9. The signal passes through the "and" network 296 because of the production of a relatively high voltage on the right output terminal of the flip-flop 290. Since a signal passes through the "and" network 290, the card circulating with the drum 22 becomes transferred to the drum 20 and the card circulating with the drum 20 becomes transferred to the drum 22.

The signal in the line 290 passes through the "or" network 346 to the flip-flop 348 and triggers the flip-flop to its true state. This causes the tube 352 to become conductive and the coil 178 to become energized. By energizing the coil 178, the gate 177 becomes actuated to transfer the card on the drum 20 to the drum 24. In this way, the card becomes deposited in the stack 181. This is proper since it is desired to deposit in the stack 181 all of the cards originally obtained from the input stack 14.

The signal in the line 290 also passes through the "or" network 358 to the left input terminal of the flip-flop 258. The signal triggers the flip-flop 258 to its true state, as represented by a relatively high voltage on the left output terminal of the flip-flop. The signal passing through the "or" network 358 is also introduced to the flip-flop 360. The signal triggers the flip-flop 360 to its true state so as to make the tube 366 conductive. This causes the coil 114 to become energized such that the gate 105 becomes actuated. By actuating the gate 105, the next card in the stack 14 becomes withdrawn from the stack by the drum 18.

The next card withdrawn from the stack 14 may have a decimal value of "3" in the selective positions in a manner similar to the card just deposited in the output stack 181. Since the decimal value of "3" in the card withdrawn from the stack 14 is less than the decimal value of "4" in the card withdrawn from the stack 12, a signal is introduced from the comparator to the line 290.

The signal in the line 290 is not able to pass through the "and" network 296 because of the low voltage introduced to the "and" network from the right output terminal of the flip-flop 258. Since a signal cannot pass through the "and" network 296, the card on the drum 22 continues to circulate with the drum through further revolutions. Furthermore, the card on the drum 20 moves with the drum past the gate 130 because of the disposition of the gate in its neutral position.

The signal in the line 290 passes through the "or" network 346 and triggers the flip-flop 348 to the true state of the flip-flop. This makes the tube 352 conductive and causes the coil 178 to become energized. By energizing the coil 178, the gate 177 becomes actuated to a position for transferring the card on the drum 20 to the drum 24. In this way, the card becomes deposited in the output stack 181. This is proper since it is desired to deposit in the stack 181 all of the cards originally obtained from the stack 14.

It will be seen from the above discussion that the system shown in FIGURES 1 to 9, inclusive, and described fully above operates to produce a separation of the cards in the input stacks 12 and 14 in accordance with the information at selective positions on the cards. All of the cards in the input stack 14 pass to the output stack 181. The cards in the input stack 12 having information corresponding to the information in the input stack 14 also pass to the output stack 181. The remaining cards in the input stack 12 pass to the output stack 174. In this way, the system shown in FIGURES 1 to 9, inclusive, provides a collating operation on the cards. In such a collating operation, cards from two or more input stacks pass to two or more output stacks in accordance with the information on the cards.

It should be appreciated that the collating operation described above is only by way of example and that other types of collating operations may also be performed. For example, the cards in the input stack 12 can be separated from the cards in the input stack 14 having corresponding information by leading only these cards to the output stack 181. The remaining cards in the input stack 12 can be mixed in the output stack 174 with the cards from the input stack 14. In this way, the cards from the input stack 12 become positioned in the output stacks 174 and 181 in a pattern somewhat opposite to that performed by the apparatus shown in FIGURES 1 to 9, inclusive, and described fully above.

The introduction of the cards from the input stack 12 to the output stacks 174 and 181 in a manner similar to that described in the previous paragraph can be accomplished by changing a minimum number of connections in the circuitry shown in FIGURE 8. For example, the connection from the line 290 to the "or" network 346 in FIGURE 8 can be eliminated. This would cause only the cards from the input stack 12 with information corresponding to cards in the input stack 14 to be transferred from the drum 20 to the drum 24 for collection in the output stack 181. The other cards from the input stack 12 and all of the cards from the input stack 14 would continue past the gate 177 to the fixed gate 172 for transfer to the drum 26 and then to the output stack 174.

It may also be possible to produce a further separation in the cards from the input stacks 12 and 14. As previously described, in the embodiment shown in FIGURES 1 to 9, inclusive, the output stack 181 receives all of the cards from the input stack 14 and particular cards from the input stack 12. These particular cards from the input stack 12 have information corresponding to the information in some of the cards from the input stack. At certain times, it may be desired to separate the cards travelling toward the output stack 181 so that the particular cards originally obtained from the input stack 12 become separated from the cards in the input stack 14. This can be accomplished by using all of the apparatus shown in FIGURES 1 to 9, inclusive, and by further including the apparatus shown in FIGURE 10.

The apparatus shown in FIGURE 10 includes the drums 20, 24 and 26 and includes the pivotable gate 177 and the output stack 181 associated with the drum 24. A pivotable gate 400 having a construction similar to the gate 177 is also included in the apparatus shown in FIGURE 10. The pivotable gate 400 is disposed in contiguous relationship to the drum 24 and to a drum 402 at a position between the gate 177 and the output stack 181 in the direction of rotation of the drum 24. The gate 400 is disposed to couple the drums 24 and 402 in one position for a transfer to the drum 402 of the cards on the drum 24. An output stack 404 corresponding to the stack 181 is disposed in contiguous relationship to the drum 402 to receive the cards transferred to the drum.

Certain additional electrical stages are included in FIGURE 10 to control the transfer of the cards from the drum 24 to the drum 402. These stages include a flip-flop 408 having its left input terminal connected to the line 292 from the comparator 266. The signals on the line 292 are also introduced to the input terminal of a delay line 410 having its output terminal connected to the right input terminal of the flip-flop 408. The voltage on the left output terminal of the flip-flop 408 is introduced to the grid of a tube 412 having its cathode grounded. A resistance 414 and a coil 416 are in series between the plate of the tube 412 and the positive terminal of the voltage source 310. The coil 416 is included in the gate 400 to control the pivotal disposition of the gate.

As previously described, a signal is produced on the output line 292 from the comparator 266 when the cards withdrawn from the input stacks 12 and 14 and circulating on the drums have similar information at selective positions. This signal is introduced to the grid of the flip-flop 408 to trigger the flip-flop into a true state of operation for the production of a relatively high voltage on the left output terminal of the flip-flop. The relatively high voltage on the left output terminal of the flip-flop 408 is introduced to the grid of the tube 410 to make the tube conductive. This causes current to flow through a circuit including the voltage source 310, the resistance 414, the coil 416 and the tube 412.

When current flows through the coil 414, the coil becomes energized and acts to pivot the gate 400 into a position coupling the drums 24 and 402. This causes the card travelling on the periphery of the drum 24 to become transferred to the drum 402. This card then moves on the drum 402 to the output stack 404 and becomes deposited in the output stack. In this way, only the cards from the input stack 14 become deposited in the output stack 181. Certain of the cards from the input stack 12 are deposited in the output stack 404. These cards have information corresponding to that on the cards from the input stack 14. The remaining cards from the input stack 12 become deposited in the output stack 174 in a manner similar to that described above for the embodiment shown in FIGURES 1 to 9, inclusive.

It should be appreciated that the term "transport means" is intended to include drums as well as any other type of conveyors for the cards. It also should be appreciated that the term "cards" is intended to include any type of discrete elements capable of storing and subsequently reproducing a plurality of bits of information.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with at least a pair of input stacks and with at least a pair of output stacks and with a plurality of information cards disposed in the input stacks and having a plurality of signal indications on each card and transferable to the output stacks, transport means constructed to provide a continuous movement of the cards, means coupled to the transport means and the input stacks and including retaining means for providing a controlled transfer of cards to the transport means from the input stacks, means including transducing means for decoding the signal indications at particular positions on each card transferred from the input stacks to the transport means, comparison means coupled to the decoding means for comparing the decoded signal information on the cards moved by the transport means to provide control signals in accordance with such comparison, means coupled to the transport means and the output stacks and including gating means for providing a controlled transfer of cards from the transport means to the output stacks, means coupled to the comparison means for operating on the gating means to provide a transfer of particular cards from the transport means to the output stacks in accordance with the control signals produced by the comparison means and to provide a retention of other cards on the transport means for the continuous movement of such cards, and means coupled to the comparison means for operating on the retaining means to obtain a transfer of cards from the input stacks to the transport means in accordance with the control signals produced by the comparison means.

2. In combination for use with at least a pair of input stacks and with at least a pair of output stacks and with a plurality of information cards disposed in the input stacks and having a plurality of signal indications on each card and transferable to the output stacks, means including transport means movable in a closed loop for providing a circulation of cards with the transport means, means for obtaining a circulation of the transport means, means including transducing means for decoding the signal indications at particular positions on the cards moving with the transport means, comparison means including electrical circuitry coupled to the decoding means for comparing the decoded signal information on successive pairs of cards transported by the transport means to provide control signals in accordance with the results of such comparisons, means including retaining means disposed to control the coupling between the input stacks and the transport means for obtaining a controlled transfer of cards from the input stacks to the transport means, means including gating means disposed to control the coupling between the transport means and the output stacks for obtaining a controlled transfer of particular cards from the transport means to the output stacks and for obtaining a continuous circulation of other cards with the transport means, means including electrical circuitry coupled to the comparison means for operating on the gating means to obtain a transfer to a particular one of the output stacks of one of the cards in each pair transported by the transport means and to obtain such transfer in accordance with the control signals produced by the comparison means and to obtain a circulation of the other card in each pair with the transport means, and means including electrical circuitry coupled to the comparison means for operating on the retaining means to obtain a transfer to the transport means of a card from a particular one of the input stacks for the creation with the card circulating with the transport means of a new pair of cards for comparison and to obtain such transfer in accordance with the control signals produced by the comparison means.

3. In combination for use at least a pair of input stacks with a plurality of information cards disposed in the input stacks and having a plurality of signal indications on each card, means including first and second transport members movable in closed loops for producing a movement of cards with the transport members and disposed in coupled relationship for obtaining a transfer of cards between the members, means including transducing means for decoding particular signal indications on each of the cards transferred to a first one of the members, means including first gating means operative in one position to obtain a transfer of cards from a first one of the transport members to a second one of the members and operative in a second position to obtain a transfer of cards from the second transport member to the first transport member and operative in a third position to uncouple the transport members for a movement of cards with each transport member past the position of transfer to the other transport member, means including retaining means disposed to control the coupling between the input stacks and the first transport means for providing a controlled transfer of cards from the stacks to the transfer means, at least a pair of output stacks for receiving cards moving with the first transport member past the position of transfer to the second transport member, means including second gating means disposed to control the coupling between the output stacks and the first transport means at a position past the transfer of cards to the second transport means for providing a controlled transfer of cards from the transport means to the output stacks, means including electrical circuitry coupled to the transducing means for comparing the decoded signal information on pairs of cards being transported by the transport members to produce first control signals representing an equality in the comparison, second control signals representing an inequality of one polarity in the comparison or third control signals representing an inequality of the opposite polarity in the comparison, means including electrical circuitry coupled to the comparison means for operating on the retaining means to obtain a transfer of cards from particular ones of the first and second input stacks to the first transport member in accordance with the control signals produced for the pair of cards moving with the transport members, means including electrical circuitry coupled to the comparison means for operating on the first gating means to obtain a transfer of the card on the second transport member to the first transport member for a movement to the output stacks and a transfer of the card on the first transport member to the second transport member for movement with the second transport member or to obtain a movement of the card on the first transport member past the position of transfer to the second transport member in accordance with the control signals produced for the pair of cards moving with the transport members, and means including electrical circuitry coupled to the comparing means for operating on the second gating means to obtain the transfer to particular ones of the output stacks of the cards moving with the first transport means past the position of transfer to the second transport means in accordance with the control signals produced for the pair of cards moving with the transport members.

4. In combination for use with at least a pair of input stacks and with at least a pair of output stacks and with a plurality of information cards disposed in the input stacks and having a plurality of signal indications on each card, transport means for the cards and constructed to provide movements of cards through at least first and second paths, means including transducing means disposed relative to the cards on the transport means for sensing and decoding particular signal indications on each transported card, comparison means including electrical circuitry coupled to the decoding means for comparing the decoded signal indications on successive pairs of decoded cards to provide first control signals representing an equality between the decoded information on each pair of cards, second control signals representing an inequality of one polarity between the decoded information on each pair of cards and third control signals representing an inequality of an opposite polarity between the decoded information on each pair of cards, means including first and second retaining means respectively coupled to the cards in the first and second input stacks for providing a controlled transfer of cards from the input stacks to the transport means, means including first gating means disposed in coupled relationship to the transport means and the output stacks for providing a controlled transfer of cards from the transport means to the output stacks, means including second gating means disposed in coupled relationship to the transport means to control the transport of the cards along the first path or the transport of the cards along the second path, means including electrical circuitry coupled to the comparison means for operating on the first and second retaining means to obtain a controlled transfer of cards from particular ones of the input stacks in the pair to the transport means in accordance with the production of the first, second and third control signals by the comparison means, means including electrical circuitry coupled to the comparison means for operating on the second gating means in accordance with the production of the first, second and third signals by the comparison means to obtain a retention of a particular card in each pair on the second path and a transport of the other card in the pair on the first path past the position of transfer to the second path or to obtain a transfer of a particular card in the pair from the second path to the first path and a transfer of the other card in the pair from the first path to the second path, and means including electrical circuitry coupled to the comparison means for operating on the first gating means to obtain the transfer of cards on the first path from the transport means to particular ones of the output stacks in the pair in accordance with the production of the first, second and third control signals.

5. In combination for use with at least a pair of input stacks and with at least a pair of output stacks and with a plurality of information cards disposed in the input stacks and having a plurality of signal indications on each card and transferable to the output stacks, transport means for the cards, means coupled to the input stacks and the transport means and including retaining means for providing a controlled transfer of cards from the different input stacks to the transport means, means coupled to the transport means and the output stacks and including first gating means for providing a controlled transfer of cards from the transport means to the output stacks, means coupled to the transport means and including second gating means for controlling the length of travel of the transported cards from the input stacks before transfer of the cards into the output stacks, means including electrical circuitry operatively coupled to the cards transferred to the transport means from the input stacks for sensing and decoding particular information on such cards, comparison means including electrical circuitry coupled to the decoding means for comparing the decoded information on successive pairs of transported cards, means including electrical circuitry coupled to the comparison means for operating upon the second gating means to obtain an increased length of travel for a particular one of the cards in each pair, means including electrical circuitry coupled to the comparison means for operating on the first gating means to obtain a transfer of the other card in each pair to a particular one of the output stacks in accordance with the signals produced by the comparison means, and means including electrical circuitry coupled to the comparison means for operating on the retaining means to obtain a controlled transfer to the transport means of cards from particular ones of the input stacks in accordance with the signals produced by the comparison means.

6. In combination for use with at least a pair of input stacks and with at least a pair of output stacks and with a plurality of information cards disposed in the input stacks and having a plurality of signal indications in each card and transferable to the output stacks, transport means constructed to obtain a continuous movement of the cards from the first and second input stacks to the first and second output stacks, means including transducing means disposed relative to the cards on the transport means for sensing and decoding the signal indications on the cards transferred from the first and second input stacks to the transport means, comparison means including electrical circuitry coupled to the decoding means for comparing the signal indications on pairs of transported cards to provide controlled signals in accordance with an equality in the decoded information on each pair of cards or in accordance with an inequality in such decoded information on each pair of cards and in accordance with the polarity of such inequality, means including electrical circuitry coupled to the comparison means and including retaining means between the transport means and the input stacks and operative to obtain a controlled transfer of cards from particular ones of the input stacks to the transport means in accordance with the control signals produced by the comparison means, means including electrical circuitry coupled to the comparison means and including first gating means operative upon the cards to control the movements of the cards from the input stacks to the output stacks, means responsive to the signals from the comparison means for operating upon the first gating means to divert the continuous transport of a particular one of the cards in each pair from the input stacks to the output stacks in accordance with the controlled signals produced by the comparison means and without interrupting the continuous transport of such particular card, and means including electrical circuitry coupled to the comparison means and including second gating means between the transport means and the output stacks to obtain a transfer of the other card in each pair from the transport means to particular ones of the output stacks in accordance with control signals produced by the comparison means.

7. In combination for use with at least a pair of input stacks and with at least a pair of output stacks and with a plurality of information cards in the input stacks and having a plurality of signal indications on each card and transferable to the output stacks, transport means constructed to obtain a continuous movement of the cards, means including retaining means coupled to the cards in the input stacks for providing a controlled transfer of cards from the input stacks to the transport means, means including first gating means coupled to cards on the transport means for providing a controlled transfer of cards from the transport means to the output stacks, means including second gating means coupled to the cards on the transport means for operating upon the cards on the transport means to provide a delay in the continuous transport of the cards to the output stacks without interrupting the continuous movement of the cards, means coupled to the cards transferred to the transport means from the input stacks for sensing and decoding particular information on such cards, comparison means coupled to the decoding means for comparing the decoded information on successive pairs of transported cards, means coupled to the comparison means for operating upon the second gating means to obtain a delay in the continuous transport of a particular one of the cards in each pair to the output stacks in accordance with the operation of the comparison means and without interrupting the continuous movement of the cards, means coupled to the comparison means for operating on the first gating means to obtain a controlled transfer of a particular one of the cards in each pair to the output stacks in accordance with the operation of the comparison means, and means coupled to the comparison means for operating on the retaining means to obtain a controlled transfer to the transport means of cards from particular ones of the input stacks in accordance with the signals produced by the comparison means.

8. In combination for use with at least a pair of input stacks and with a plurality of information cards disposed in the input stacks and having a plurality of indications on each card, means including a plurality of rotatable drums disposed in a particular paired relationship to provide a movement of cards with the drums during the drum rotations and to facilitate a transfer of cards between different drums in the plurality, means for providing a rotation of the drums, means including retaining means for obtaining a controlled transfer of the cards from the input stacks to the drums for movement with the drums, means including transducing means for decoding particular indications on each card transferred from the input stacks to the drums for movement with the drums, comparison means coupled to the decoding means for comparing the decoded signal information on successive cards and for producing different control signals in accordance with such comparisons, means including gate means and including at least a pair of output stacks for obtaining a controlled transfer of cards from the drums to the output stacks, means coupled to the comparison means for controlling the operation of the gate means to obtain a transfer of successive cards to particular ones of the output stacks in accordance with the production of the different control signals, and means coupled to the comparison means for operating on the retaining means to obtain a transfer of successive cards to the drums from particular ones of the input stacks in accordance with the production of the different control signals.

9. In combination for use with at least a pair of input stacks and with a plurality of information cards disposed in the input stacks and having a plurality of indications on each card, means including a rotatable drum for receiving the cards released from the input stacks and for holding the cards in fixed position on the drum during the drum rotation, means for providing a rotation of the drum, means including transducing means for decoding particular indications on the cards released to the drum, comparison means coupled to the decoding means for comparing the decoded signal information on the released cards to provide control signals in accordance with the results obtained from the comparison, means including gate means and including at least a pair of output stacks for providing a controlled transfer of cards from the drum to the output stacks, means coupled to the comparison means for operating on the gate means to obtain a transfer of the released cards to particular ones of the first and second output stacks in accordance with the control signals obtained by the comparison of the particular indications on the cards, means including retaining means for providing a controlled transfer of cards to the drum from the input stacks, and means coupled to the comparison means for operating on the retaining means to obtain a transfer of successive cards from the first and second input stacks to the drum in accordance with the control signals obtained by the comparison of the particular indications on the cards.

10. In combination for use with at least a pair of input stacks and with a plurality of information cards disposed in the input stacks and having a plurality of indications on each card, means including a rotatable drum for receiving the cards released from the input stacks and for holding the cards in fixed position on the drum during the drum rotation, means for providing a rotation of the drum, means for decoding particular indications in the plurality on the cards released to the drum, comparison means coupled to the decoding means for comparing the decoded signal information on successive pairs of the released cards to provide first control signals for a first inequality from the comparison and to provide second control signals for an opposite inequality from the comparison and to provide third control signals for an equality from the comparison, means including at least first and second output stacks for receiving the cards transferred to the drum, means coupled to the comparison means and including gate transfer means operative by the comparison signals for obtaining a transfer of the cards from the drum to the first and second output stacks in accordance with the production of the first, second and third control signals, and means coupled to the comparison means and including retaining means coupled to the drum and the input stack and operative in accordance with the production of the comparison signals for obtaining the transfer of cards from particular ones of the input stacks to the drum in accordance with the production of the first, second and third control signals to obtain a new comparison of information on the cards.

11. In combination for use with at least a pair of input stacks and with a plurality of information cards disposed in the input stacks and having a plurality of indications on each card, means including a rotatable drum for holding cards in fixed position on the drum for movement with the drum during the drum rotation, means for providing a rotation of the drum, means including retaining means for obtaining a controlled introduction of cards from the input stacks to the drum, means for decoding particular indications on the cards introduced to the drum, comparison means coupled to the decoding means for comparing the decoded signal information on successive cards to provide first and second signals in accordance with the results obtained from such comparisons, at least a pair of output stacks, means coupled to the comparison means and including gate transfer means operative by the comparison signals for obtaining the transfer to a first one of the output stacks of particular ones of the cards introduced to the drum upon the production of the first signals and for obtaining the transfer to a second one of the output stacks of particular cards introduced to the drum upon the production of the second signals, and means coupled to the comparison means for operating on the retaining means to obtain an introduction to the drum of a card from a particular one of the input stacks in accordance with the signals obtained by comparing the decoded signal indications on successive cards.

12. In combination for use with at least a pair of input stacks and with a pair of information cards disposed in the input stacks and having a plurality of indications on each card, means including a plurality of rotatable drums for holding the cards in fixed position on the drums during the drum rotations, means for providing a rotation of tthe drums, means including a first drum in the plurality for receiving the cards transferred from the first and second stacks, means including a second drum in the plurality disposed relative to the first drum for obtaining a transfer of cards from the second drum to the first drum, means including a third drum in the plurality disposed relative to the first drum for obtaining a transfer of cards from the third drum to the first drum, means for decoding particular indications in the plurality on the cards transferred to the first drum, means including first and second output stacks and including gate transfer means for providing a controlled coupling between the first drum and the output stacks to obtain a controlled transfer of cards from the drum to the output stacks, comparison means coupled electrically to the decoding means and to the gate transfer means for comparing the decoded indications on successive cards to provide signals in accordance with such comparison and for introducing such signals to the gate transfer means to control the passage of the cards to the first and second output stacks in accordance with such comparison, and means coupled electrically to the comparison means and including retaining means coupled to the input stacks and operative by the comparison signals for providing for a controlled transfer of cards from the first and second input stacks to the second and third drums, respectively, in accordance with the production of such comparison signals.

13. In combination for use with at least a pair of input stacks and with a pair of information cards disposed in the input stacks and having a plurality of indications on each card, means including a plurality of rotatable drums for holding the cards in fixed position on the drums during the drum rotations, means for providing a rotation of the drums, a first drum in the plurality for receiving the cards transferred from the first and second stacks, means including a second drum in the plurality disposed relative to the first drum for obtaining a transfer of cards from the second drum to the first drum, means including a third drum in the plurality disposed relative to the first drum for obtaining a transfer of cards from the third drum to the first drum, means for decoding particular indications in the plurality on successive cards transferred to the first drum, comparison means operatively coupled to the decoding means for comparing the decoded indications on the cards transferred to the first drum, means including first and second output stacks and including gate means coupling the first drum to the output stacks for obtaining a transfer to the output stacks of cards transferred to the first drum from the first and second input stacks, a fourth drum disposed relative to the first drum for receiving cards transferred to the first drum from the first and second input stacks, means including first electrical circuitry coupled to the comparison means and including gating means disposed between the first and fourth drums for operating upon such gating means in accordance with the operation of the comparison means to obtain a transfer of cards between the fourth drum and the first drum or to obtain a movement of the cards with the first drum past the fourth drum, means including electrical circuitry coupled to the comparison means for operating on the gate means coupling the first drum to the output stacks to obtain a transfer of the cards moving with the first drum past the position of transfer to the fourth drum and for obtaining such a transfer of the cards to a particular one of the output stacks in accordance with the operation of the comparison means, and means including electrical circuitry coupled to the comparison means for obtaining a controlled transfer of cards to the second and third drums from particular ones of the input stacks in accordance with the operation of the comparison means.

14. In combination for use with at least a pair of input stacks and with a plurality of information cards disposed in the input stacks and having a plurality of signal indications on each card, means including a plurality of rotatable drums disposed in a particular relationship to provide a movement of cards with the drums and to hold the cards in fixed position on the drums and to provide a transfer of cards between the different drums in the plurality, means for providing a rotation of the drums, means for obtaining a controlled transfer of cards from the input stacks to the drums for the circulation with the drums of pairs of cards transferred to the drums, means for decoding the signal indications at particular positions on each card transferred from the input stacks to the drums for circulation with the drums, comparison means coupled to the decoding means for comparing the decoded signal information on successive pairs of cards disposed on the drums and for producing different control signals in accordance with such comparisons, at least a pair of output stacks, means coupled to the comparison means and including gate transfer means operative by the control signals for producing a transfer of a particular one of the cards in each pair to a particular one of the output stacks in accordance with the control signals produced for the pair of cards, and means coupled to the comparison means and operative upon the control means for the cards from the input stacks for producing a transfer of the next card in a particular one of the input stacks to the drum in accordance with the control signals obtained for the previous pair of cards moving with the drums to obtain a new pair of cards for the comparison of signal information.

15. In combination for use with at least a pair of input stacks and with a plurality of information cards disposed in the input stacks and having a plurality of indications on each card, means including a plurality of rotatable drums disposed with respect to one another to provide a movement of cards with the drums and to hold the cards in fixed position on the drums during the drum rotations and to facilitate a transfer of cards between the different drums in the the plurality, means for providing a rotation of the drums, means including a first drum in the plurality for receiving the cards transferred to the drums from the first and second input stacks, means including a second drum in the plurality disposed in paired relationship to the first drum for receiving particular cards transferred to the first drum from the input stacks for a movement at any one instant of a first card with the first drum and a second card with the second drum, means for decoding particular indications in the plurality on each card transferred from the input stacks to the first drum for movement with the drum, comparison means coupled to the decoding means for comparing the decoded signal information on the first and second cards moving with the first and second drums and for producing first and second control signals in accordance with such comparisons, at least a pair of output stacks, means including first gate transfer means disposed between the first and second drums in the plurality and responsive to the signals from the comparison means for obtaining an operation of the first gate transfer means to provide a transfer of cards between the first and second drums in accordance with such comparison, means coupled electrically to the comparison means and including second gate transfer means responsive to the signals from the comparison means for producing a transfer of a particular one of the first and second cards moving with the first drum past the position of transfer to the second drum and for obtaining a transfer of the particular card to a particular one of the first and second output stacks in accordance with the production of the different control signals, and means coupled electrically to the comparison means and including retaining means coupled to the cards in the first and second input stacks for obtaining a controlled transfer of cards to the first drum in the plurality from particular ones of the input stacks in accordance with the production of the different control signals to produce a new pair of cards for the comparison of signal information.

16. In combination for use with at least a pair of input stacks and with a plurality of information cards disposed in the input stacks and having a plurality of signal indications on each card, means including a plurality of rotatable drums for holding the cards on the periphery of the drums to provide a movement of the cards with the drums, means for providing a rotation of the drums, means including at least a first drum in the plurality and including first retaining means coupled to the drum for obtaining a controlled transfer of cards to the drum from the first input stack, means including at least a second drum in the plurality and including second retaining means coupled to the drum for obtaining a controlled transfer of cards to the drum from the second input stack, means including first gating means for controlling the transfer of cards from the first and second drums to a third drum in the plurality, means including a fourth drum in the plurality for receiving particular cards transferred from the first and second drums to the third drum, means including second gating means disposed between the third and fourth drums and operable in one state to provide a transfer of cards from the third drum to the fourth drum and operable in a second state to provide a transfer of cards from the fourth drum to the third drum and operable in a third state to uncouple the drums, means including transducing means disposed relative to the cards on the third drum for sensing particular information on each card respectively transferred to the third drum from the first and second drums, comparison means operatively coupled to the transducing means for comparing the signal indications on the cards disposed on the drums in the plurality, means including electrical circuitry coupled to the comparison means for controlling the state of operation of the second gating means in accordance with the operation of the comparison means to obtain a selective transfer of cards between the third and fourth drums for the movement of particular cards on the third drum past the gating means, at least a pair of output stacks disposed at spaced positions to receive the cards moving with the third drum past the position of transfer to the fourth drum, the second output stack being disposed beyond the third output stack in the direction of movement of the third drum, means including at least a fifth drum for transferring to the first output stack cards moving with the third drum past the position of transfer to the fourth drum, third gating means disposed between the third and fifth drums and operable in one state to couple the third and fifth drums for a transfer of cards from the third drum to the fifth drum and operable in a second state to uncouple the drums for a movement of the cards with the third drum to the second output stack and past the position of transfer to the fifth drum, and means including electrical circuitry operatively coupled to the comparison means for controlling the state of operation of the third gating means in accordance with the operation of the comparison means to obtain a selective transfer of cards to the first and second output stacks.

17. In combination for use with at least a pair of input stacks and with a plurality of information cards disposed in the input stacks and having a plurality of signal indications on each card, means including a plurality of rotatable drums for holding the cards in fixed position on the periphery of the drums to obtain a movement of the cards with the drums, means for providing a rotation of the drums, a first drum in the plurality being disposed to receive the cards transferred from the first and second input stacks, means including a second drum in the plurality and including retaining means coupled to the second drum for providing a controlled transfer of cards from the first input stack to the first drum, means including a third drum in the plurality and including retaining means coupled to the third drum for controlling the transfer of cards from the second input stack to the first drum, a fourth drum in the plurality for receiving cards transferred to the first drum from the first and second input stacks, a plurality of output stacks, means including first gating means disposed between the first and fourth drums for controlling the passage of cards to the output stacks from the first and fourth drums, means for decoding the signal information at particular positions on the cards transferred to the first drum, comparison means including electrical circuitry coupled to the decoding means for comparing the decoded signal information on successive pairs of cards moving with the first and fourth drums, a pair of output stacks disposed relative to the first drum in the plurality for receiving cards moving with the first drum past the position of transfer to the fourth drum, means including electrical circuitry coupled to the comparison means for operating on the first gating means to obtain the passage to the output stacks of particular ones of the cards in the pairs in accordance with such comparison, means including second gating means disposed relative to the first drum at a position past the first gating means in the direction of the movement of the drum for controlling the passage of the cards to different output stacks in the plurality, means including electrical circuitry coupled to the comparison means for operating on second gating means in accordance with the operation of the comparison means to obtain a transfer to particular ones of the output stacks of the cards moving towards the output stacks, and means including electrical circuitry coupled to the comparing means for operating on the retaining means in accordance with the operation of the comparison means to obtain a transfer of cards to the first drum from particular ones of the input stacks.

18. In combination for use with at least a pair of input stacks and with a plurality of information cards disposed in the input stacks and having a plurality of signal indications on each card, means including a first rotatable drum for receiving the cards transferred from the first and second input stacks and for holding the cards in fixed position on the drum during the drum rotation, means including a second rotatable drum disposed in contiguous relationship to the first drum to receive particular cards transferred to the first drum from the input stacks and to hold the cards in fixed position on the drum during the drum rotation, means for providing a rotation of the first and second drums, first and second output stacks disposed to receive the cards moving on the first drum past the position at which the first and second drums are contiguous, means including first gating means disposed between the first and second drums near their position of contiguity and operable in a first state to couple the drums for a movement of a card from the first drum to the second drum and operable in a second state to couple the drums for a movement of a card from the second drum to the first drum and operable in a third state to uncouple the drums for a movement of a card with the first drum to the output stack, transducing means for reading the signal indications at particular positions on the cards transferred to the first drum, comparison means coupled to the transducing means for comparing the information read on successive pairs of cards positioned on the first and second drums, means coupled to the comparison means for controlling the state of operation of the gating means in accordance with the compared information, means including second gating means associated with the first drum and the first and second output stacks and operable in a first state to obtain a movement of the cards to the first output stack and operable in a second state to obtain a movement of the cards to the second output stack, means coupled to the comparing means for controlling the state of operation of the second gating means in accordance with the signal information read and compared at the particular positions on the successive pairs of cards, and means coupled to the comparison means and including retaining means operative in accordance with the compared information for obtaining a transfer of the next cards to the first drum from particular ones of the input stacks in accordance with the compared information.

19. In combination for use with at least a pair of input stacks and with a plurality of information cards disposed in the input stacks and having a plurality of signal indications on each card, means including a plurality of rotatable drums disposed in a particular relationship with respect to one another to provide a movement of cards with the drums and to provide a transfer of cards between the different drums in the plurality, means for providing a rotation of the drums, means for applying vacuum pressures to the peripheries of the drums to maintain the cards in fixed position on the drums, at least a pair of output stacks disposed to receive the cards moving with a first one of the drums in the plurality, first gating means disposed between the first drum in the plurality and a second drum in the plurality to control the effect of the vacuum pressures on the peripheries of the first and second drums for the passage of the cards to the output stacks in a first path including the first drum or in a second path including the first and second drums, second gating means associated with the first drum in the plurality and with the output stacks to control the effect of the vacuum pressures on the periphery of the first drum at a position past the first gating means for the passage of the cards to particular ones of the output stacks, means for decoding particular signal indications on the cards transferred to the first drum from the input stacks, comparison means coupled to the decoding means for comparing the decoded signal indications on successive pairs of cards moving with the first and second drums to control the operation of the first and second gating means for the passage to particular ones of the output stacks of one of the cards in each of the successive pairs in accordance with the results of such comparison, and means coupled to the comparison means and including retaining means operative by the compared signal indications and including particular drums in the plurality for obtaining a transfer to the first drum of the next cards from particular ones of the input stacks in accordance with the results of the comparisons.

20. In combination for use with at least first and second input stacks and with a plurality of information cards disposed in the first and second input stacks and having a plurality of signal indications on each card, means including a plurality of drums disposed in a particular relationship with respect to one another to provide a movement of cards with the drums and to provide a transfer of cards between the different drums in the plurality, means for providing a rotation of the drums, means including retaining means for providing a controlled transfer of cards from the different input stacks to the drums for movement with the drums, means for decoding particular signal indications on the cards moving with the drums, comparison means coupled to the decoding means for comparing the decoded information on the different cards moving with the drums, at least first and second output stacks disposed relative to the drums to receive cards from the drums, means including electrical circuitry coupled to the comparison means for obtaining a movement to the first output stack of the cards from the first input stack and the cards from the second input stack having particular information relative to the cards moving with the drums from the first input stack and for obtaining a movement to the second output stack of the cards from the second input stack not passing to the first output stack, and means including electrical circuitry coupled to the comparison means and operative upon the retaining means to obtain a transfer to the drums of cards from the first input stack and the second input stack in accordance with the comparison of the information on the cards and in replacement for the cards moving to the output stacks.

21. In combination for use with at least a pair of input stacks and with at least a pair of output stacks and with a plurality of information cards disposed in the information stacks and having a plurality of signal indications on each card and transferable to the output stacks, transport means constructed to provide a movement of the cards in divergent paths on the transport means, means including transducing means for decoding the signal indications on the cards transported by the transport means, comparison means including electrical circuitry coupled to the decoding means for comparing the signal indications on pairs of cards transported by the transport means to provide control signals in accordance with an equality in the decoded information on each pair of cards or in accordance with an inequality in such decoded information and in accordance with the polarity of such inequality, means including electrical circuitry coupled to the comparison means and including retaining means between the transport means and the input stacks and operative by the electrical circuitry to obtain a controlled transfer of cards from particular ones of the input stacks to the transport means in accordance with the control signals produced by the comparison means, and means including electrical circuitry coupled to the comparison means and including gating means between the transport means and the output stacks and operative by the electrical circuitry to obtain a movement of the cards in the divergent paths on the transport means in accordance with the control signals produced by the comparison means and to obtain a transfer of the cards from the transport means to the output stacks in accordance with the divergent paths of movement of the cards on the transport means.

22. In combination for use with at least a pair of input stacks and with at least a pair of output stacks and with a plurality of information cards disposed in the input stacks and having a plurality of signal indications on each card and transferrable to the output stacks, transport means constructed to provide a movement of the cards in divergent paths on the transport means, means coupled to the input stacks and the transport means and including retaining means for providing a controlled transfer of cards from the different input stacks to the transport means, means coupled to the transport means and the output stacks and including gating means for providing a controlled movement of the cards in the divergent paths on the transport means and a controlled transfer of cards from the transport means to the output stacks, means for decoding particular information on the cards transported by the transporting means at any instant, comparison means coupled to the decoding means for comparing the decoded information on successive pairs of transported cards to produce signals in accordance with the results of such comparison, means coupled to the comparison means for operating on the gating means in accordance with the signals from the comparison means to obtain the movement of the cards in the divergent paths on the transport means in accordance with the results of the comparison for a passage to one of the output stacks of the cards from one of the input stacks and the cards from the second input stack having particular information relative to the cards being transported by the transport means from the first input stack and for a passage to the second output stack of the cards from the second input stack not passing to the first output stack, and means coupled to the comparison means for operating on the retaining means to obtain the transfer to the transport means of cards from particular ones of the input stacks in accordance with the comparison of the decoded signal information on the cards transported by the transport means.

23. In combination for use with at least a pair of input stacks and with a plurality of information cards disposed in the input stacks and having a plurality of signal indications on each card, transport means constructed to provide a movement of the cards in divergent paths on the transport means; means including transducing means for decoding particular signal indications on each card transported by the transport means; comparison means including electrical circuitry coupled to the decoding means for comparing the decoded signal indications on successive pairs of cards transported by the transport means to provide first control signals representing an equality between the decoded information on each pair of cards, second control signals representing an inequality of one polarity between the decoded information on each pair of cards and third control signals representing an inequality of an opposite polarity between the decoded information on each pair of cards; means including retaining means disposed to control the coupling between the cards in the input stacks and the transport means for providing a controlled transfer of cards from the input stacks to the transport means, at least a pair of output stacks disposed relative to the transport means to receive cards transported by the transport means, means including gating means disposed to control the coupling between the transport means and the output stacks for providing a controlled movement of the cards through the divergent paths on the transport means and a controlled transfer of cards from the transport means to the output stacks in accordance with the movements of the cards in the divergent paths on the transport means, means including electrical circuitry coupled to the comparison means for operating on the retaining means to obtain a controlled transfer of cards from particular ones of the input stacks to the transport means in accordance with the production of the first, second and third control signals, and means including electrical circuitry coupled to the comparison means for operating on the gating means to obtain a controlled movement of the cards through the divergent paths on the transport means and the controlled transfer of cards from the transport means to particular ones of the output stacks in accordance with the production of the first, second and third control signals.

24. In combinaation for use with at least a pair of input stacks and with at least a pair of output stacks and with a plurality of information cards disposed in the input stacks and having a plurality of signal indications on each card and transferable to the output stacks, transport means constructed to provide a continuous movement of the cards in paths having different lengths, means including transducer means disposed relative to the cards on the transport means for decoding the signal information at particular positions on the cards transported by the transport means, means coupled to the decoding means for comparing the decoded information on the cards transported by the transport means to provide controlled signals in accordance with the results of such comparison, means coupled to the comparing means for providing a transfer to the output stacks from the transport means of particular cards being continuously moved by the transport means and for providing a transfer of such cards to particular ones of the output stacks in accordance with the control signals produced by the comparison means and for providing a retention of other cards on the transport means for the continuous movement of such cards through paths having different lengths from the lengths of the paths of the cards transferred to the output stacks, and means coupled to the comparison means for providing a transfer of cards from particular ones of the input stacks to the transport means in accordance with control signals produced by the comparison means.

References Cited in the file of this patent

UNITED STATES PATENTS

| | | |
|---|---|---|
| 1,669,238 | Goss | May 8, 1928 |
| 1,710,691 | Carroll | Apr. 30, 1929 |
| 2,539,998 | Holland-Martin et al. | Jan. 30, 1951 |
| 2,602,544 | Phelps | July 8, 1952 |
| 2,620,924 | Kiesters | Dec. 9, 1952 |
| 2,677,815 | Brustman | May 4, 1954 |
| 2,686,052 | Winkler | Aug. 10, 1954 |
| 2,712,898 | Knutsen | July 12, 1955 |
| 2,752,154 | Nelson | June 26, 1956 |